(12) United States Patent
Abele et al.

(10) Patent No.: US 10,782,527 B2
(45) Date of Patent: Sep. 22, 2020

(54) METHODS AND APPARATUS TO IDENTIFY LENSES OF HEAD-WEARABLE APPARATUS

(71) Applicant: North Inc., Kitchener (CA)

(72) Inventors: Nicolas Abele, Lausanne (CH); Michel Olivieri, Echallens (CH); Gerard McGlew, Romainmôtier (CH); Michel Combes, Ecublens (CH)

(73) Assignee: NORTH INC., Kitchener (CA)

( * ) Notice: Subject to any disclaimer, the term of this patent is extended or adjusted under 35 U.S.C. 154(b) by 262 days.

(21) Appl. No.: 15/855,596

(22) Filed: Dec. 27, 2017

(65) Prior Publication Data

US 2019/0041644 A1 Feb. 7, 2019

(51) Int. Cl.
| | | |
|---|---|---|
| *G02B 27/01* | (2006.01) | |
| *G06K 9/34* | (2006.01) | |
| *G06K 9/62* | (2006.01) | |
| *G02C 7/08* | (2006.01) | |
| *G02C 7/10* | (2006.01) | |

(Continued)

(52) U.S. Cl.
CPC ..... *G02B 27/0172* (2013.01); *G02B 27/0176* (2013.01); *G06K 9/344* (2013.01); *G06K 9/6267* (2013.01); *G02B 2027/014* (2013.01); *G02B 2027/0118* (2013.01); *G02B 2027/0156* (2013.01); *G02B 2027/0178* (2013.01); *G02C 7/021* (2013.01); *G02C 7/08* (2013.01); *G02C 7/10* (2013.01); *G02C 2200/08* (2013.01);
(Continued)

(58) Field of Classification Search
CPC ............ G02B 27/0172; G02B 27/0176; G02B 2027/0118; G02B 2027/104; G02B 2027/0156; G02B 2027/0178; G02C 7/08; G02C 7/10; G02C 2200/08; G06K 9/344; G06K 9/6267; G06K 2209/01; G06N 9/3155

See application file for complete search history.

(56) References Cited

U.S. PATENT DOCUMENTS

| | | | | | |
|---|---|---|---|---|---|
| 5,220,166 | A | * | 6/1993 | Takeuchi | ................. G06K 7/12 235/491 |
| 5,602,603 | A | * | 2/1997 | Bondet | .................... G02C 1/04 351/108 |

(Continued)

FOREIGN PATENT DOCUMENTS

| | | |
|---|---|---|
| WO | 2011062591 | 5/2011 |
| WO | 2017004695 | 1/2017 |

OTHER PUBLICATIONS

Solos, "Solos Smart Cycling Glasses", May 1, 2016, last retrieved from [http://www.solos-wearables.com], on Jul. 21, 2017, 8 pages.

(Continued)

*Primary Examiner* — Yubin Hung

(57) ABSTRACT

Methods and apparatus to identify lenses of head-wearable apparatus are disclosed. Example glasses disclosed herein include a frame and an image generator coupled to the frame. A first lens is removably carriable by the frame. The first lens has a first identifier to provide a first code representative of a first optical characteristic of the first lens. The image generator is to project an image toward the first lens when the first lens is carried by the frame. A reader is to read the first code when the first lens is carried by the frame.

12 Claims, 10 Drawing Sheets

(51) Int. Cl.
*H04N 9/31* (2006.01)
*G02C 7/02* (2006.01)

(52) U.S. Cl.
CPC ....... *G06K 2209/01* (2013.01); *H04N 9/3155* (2013.01); *H04N 9/3173* (2013.01)

(56) References Cited

U.S. PATENT DOCUMENTS

| | | | |
|---|---|---|---|
| 6,349,001 B1 | 2/2002 | Spitzer | |
| 9,671,612 B2 | 6/2017 | Kress et al. | |
| 2005/0073650 A1* | 4/2005 | Ito | G02C 7/021 351/200 |
| 2007/0121059 A1* | 5/2007 | Chiou | G02C 1/04 351/103 |
| 2009/0040296 A1 | 2/2009 | Moscato | |
| 2012/0038879 A1* | 2/2012 | Reyes | A61F 9/025 351/107 |
| 2013/0169772 A1* | 7/2013 | Kim | H04N 13/332 348/56 |
| 2014/0022411 A1* | 1/2014 | Kano | H04N 5/23203 348/224.1 |
| 2017/0003519 A1* | 1/2017 | Burkert | G02C 7/083 |
| 2017/0178589 A1* | 6/2017 | Finkenbiner-Pepper | G02B 7/025 |
| 2017/0205630 A1 | 7/2017 | Tremblay et al. | |
| 2019/0101980 A1* | 4/2019 | Stafford | G02C 11/10 |
| 2019/0310492 A1* | 10/2019 | Gromotka | G02C 7/021 |

OTHER PUBLICATIONS

Padmanaban et al., "Optimizing virtual reality for all users through gaze-contingent and adaptive focus displays", Feb. 28, 2017, Proceedings of the National Academy of Sciences, vol. 114, No. 9, pp. 2183-2188, 6 pages.

Wang et al., "Augmented reality with image registration, vision correction and sunlight readability via liquid crystal levices", Mar. 27, 2017, Scientific Reports, 2017; 7: 433, 16 pages.

* cited by examiner

METHODS AND APPARATUS TO IDENTIFY LENSES OF HEAD-WEARABLE APPARATUS

FIELD OF THE DISCLOSURE

This disclosure relates generally to head-wearable displays and, more particularly, to methods and apparatus to identify lenses of head-wearable apparatus.

BACKGROUND

Wearable devices, such as head-wearable displays, provide computing devices in the form of glasses or sunglasses (e.g., smart glasses). Wearable devices typically do not include interchangeable lenses having different characteristic(s) because such characteristics may affect an image to be displayed by the wearable device. For example, known head-wearable apparatus require manually inputting lens characteristics (e.g., a serial number) to a configuration device communicatively coupled to the head-wearable apparatus, which may be prone to user error.

BRIEF DESCRIPTION OF THE DRAWINGS

FIG. 1A illustrates an example pair of lenses that may be used to implement the example head-wearable apparatus of FIG. 1.

Figure 1:
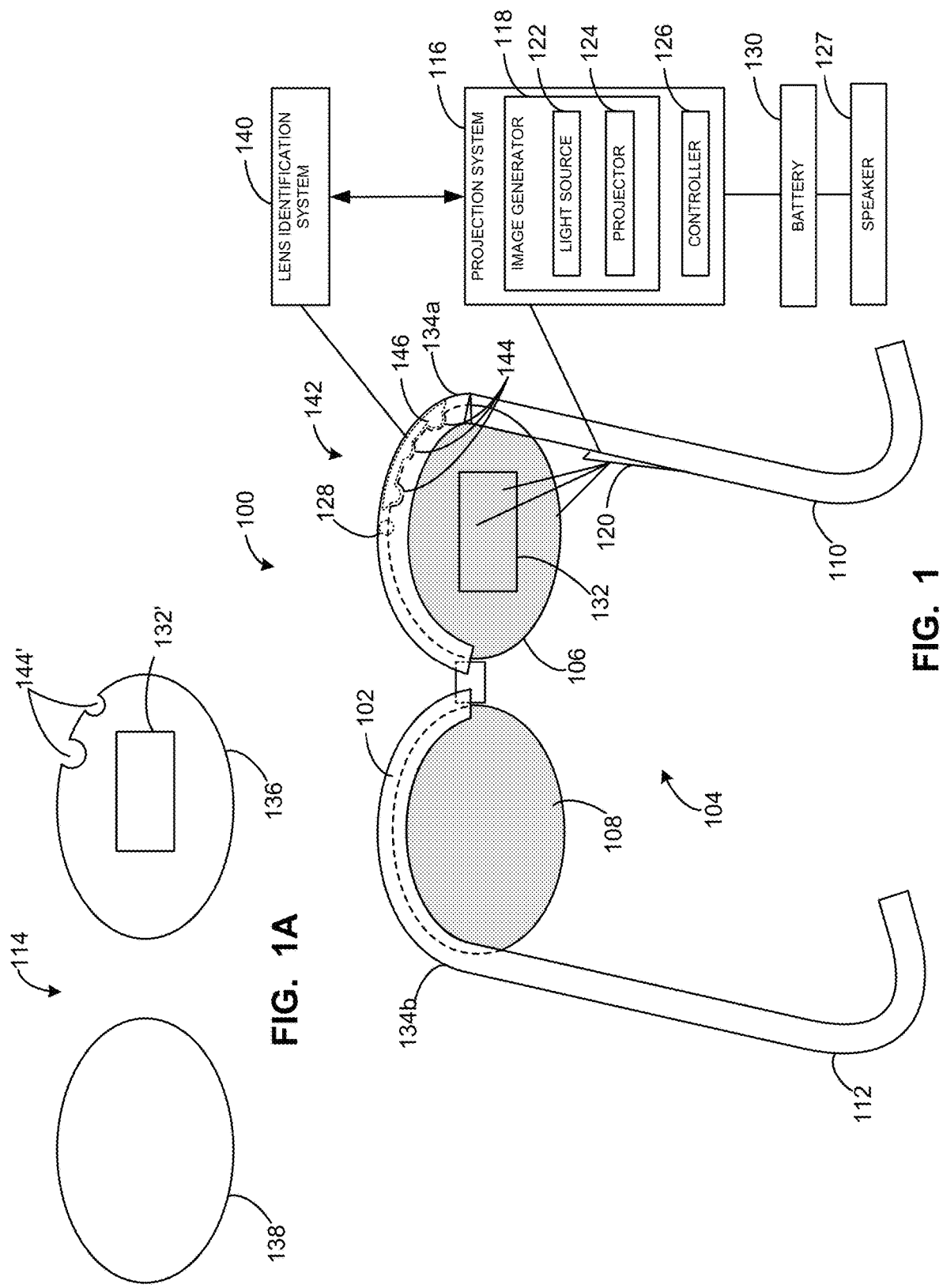
FIG. 1 illustrates example head-wearable apparatus constructed in accordance with the teachings of this disclosure.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts. Stating that a part is coupled or connected to another part indicates that the parts are jointed directly or through one or more intervening parts. Thus, physical contact is not required for two parts to be coupled or connected.

DETAILED DESCRIPTION

Sport eyewear (e.g., sunglasses) often employ different types of lenses for different environment conditions (e.g., snow, sun, wind protection, etc.). The different types of lenses may include different tint levels, different tint colors (e.g., green, yellow, brown, etc.), polarization, prescriptions, and/or any other characteristic(s). For example, lenses may have a plurality of different tinted characteristics to reduce an amount of light that passes through the lenses, and thereby reducing eyestrain in bright environments. Some example lenses include a prescription to help a user see clearly, etc.

Head-worn apparatus (e.g., smart glasses) employ a computing platform to project information (e.g., digital imagery) that is super imposed onto a lens. In some examples, an image source projects digital imagery to a precise location associated with a viewing angle of a user wearing the head-wearable apparatus. Typically, the type of lens (e.g., tinted, clear, prescription, etc.) affects the image display capabilities of a head-wearable apparatus. Thus, one or more parameters of a projector system of a head-wearable apparatus typically need adjustment based on the type of lens that is used with the head-wearable apparatus.

Known head-wearable apparatus require manually inputting the lens characteristics (e.g., a serial number) to a configuration device communicatively coupled to the head-wearable apparatus. The configuration device adjusts the projection system parameters and/or settings based on the input information associated with the lens. However, if the information associated with the lens is input incorrectly, the projection system will project the image incorrectly. In other words, the projection system displays the image based on the incorrect information. Thus, to avoid user error, manufacturers typically calibrate the projector of a head-wearable apparatus during manufacturing because only one type of lens will be used with the head-wearable apparatus. Furthermore, a head-wearable apparatus typically does not provide user flexibility to interchange different types of lenses (e.g., a tinted lens or a clear lens).

Example head-wearable apparatus disclosed herein enable interchangeability of different types of lenses. For example, head-wearable apparatus disclosed herein enable a first lens having one or more characteristics (e.g., a first characteristic) to be interchanged (e.g., swapped) with a second lens having one or more second characteristics (e.g., a second characteristic) different than the first characteristics. For example, the first lens and the second lens may be removably coupled to a frame of the head-wearable apparatus. Thus, a user (e.g., the same user or owner of the head-wearable apparatus) can swap the first lens with the second lens (e.g., in the field and not in a manufacturing facility).

To enable a head-wearable apparatus (e.g., either for information display, virtual reality or augmented reality) employing interchangeable lenses disclosed herein to accurately project an image, the head-wearable apparatus disclosed herein access information associated with the lens type (e.g., an optical characteristic of a lens). For example, access to tint information pertaining the lens may allow the projection system to change different parameters (e.g., brightness, location, etc.) of the projected image as a function of one or more characteristics of the lens coupled to the frame (e.g., a tint level characteristic or another characteristic(s) or type of lens).

Example head-wearable apparatus disclosed herein automatically identify one or more characteristics of the lens attached to the frame. To enable example head-wearable apparatus disclosed herein to identify or detect one or more characteristics of a lens coupled to the head-wearable apparatus, example head-wearable apparatus disclosed herein employ a detection system. Specifically, example detection systems disclosed herein can identify one or more identifying features provided on a lens that generate an input code when the lens is attached to an example frame of the head-wearable apparatus disclosed herein. For example, the one or more identifying features and/or the input code may be representative of one or more characteristics associated with the lens. The one or more identifying features disclosed herein may include, but not limited to, a notch or cavity, an absorptive surface, a reflective surface, a conductive trace, an electrical component (e.g., a resistor), a memory component or device (e.g., a near-field communication memory chip), a radio-frequency identification tag (e.g., a RFID tag), a magnet, and/or any combination(s) thereof. The one or more identifying features disclosed herein may be formed (e.g., integrally formed) with the lens, positioned on the lens, affixed to the lens (e.g., via adhesive) and/or otherwise located on the lens. In some examples, the one or more identifying features disclosed herein may be located on or adjacent a peripheral edge or perimeter of the lens.

To read the coded input provided by the one or more identifying features of the lens, example detection systems disclosed herein may employ one or more readers. For example, an example reader disclosed herein may be formed with or located within an example frame of the head-wearable apparatus disclosed herein. The example readers disclosed herein may include, but not limited to, a mechanical switch, an optical sensor, a proximity sensor, a RFID reader, a magnetic reader, an electrical pad, a near-field communication antenna, and/or any combination thereof and/or any other sensor.

In some instances, example head-wearable apparatus disclosed herein may automatically adjust one or more settings or parameters of an example projector system based on the detected or identified characteristic(s) of the lens attached to the frame of the head-wearable apparatus. For example, automated adjustment of the one or more parameters of the projection system based on an automated detection of a characteristic of the lens and occur without any user input or configuration. The one or more settings or parameters disclosed herein may include, but not limited to, a brightness level, a color level, a volume level, content delivered, and/or any other setting of the head-wearable apparatus.

In some examples, example head-wearable apparatus disclosed herein may employ the detection system to detect a presence and/or absence of a lens relative to the frame of the head-wearable apparatus. For example, example head-wearable apparatus disclosed herein may remove power to a projection system of the head-wearable apparatus when a lens is not detected by the head-wearable apparatus (e.g., when a lens is removed from or is not carried by a frame of the head-wearable apparatus) and provide power to the projection system when a lens is detected by the detection system (e.g., when a lens is attached to or carried by a frame of the head-wearable apparatus).

FIG. 1 illustrates an example head-wearable apparatus 100 constructed in accordance with the teachings of this disclosure. The head-wearable apparatus 100 of the illustrated example may be a wearable computing device configured to receive information, transmit information and/or to display information. The head-wearable apparatus 100 of the illustrated example is formed in the shape of glasses (e.g., smart glasses). In some examples, the head-wearable apparatus 100 may be in the form of goggles, a shield, and/or another wearable device.

The head-wearable apparatus 100 of the illustrated example includes a frame 102 to support or carry a first pair of lenses 104 (e.g., a first lens 106 and a second lens 108). To secure the head-wearable apparatus 100 to a user, the frame 102 of the illustrated example includes a first stem 110 (e.g., a right-side ear piece) and a second stem 112 (e.g., a left-side ear piece). As discussed in greater detail below, the first pair of lenses 104 are removably coupled to, or carried by, the frame 102. To this end, the first pair of lenses 104 may be interchangeable with a second pair of lenses 114 shown in FIG. 1A.

To project or overlay an image (e.g., a digital image) adjacent (e.g., over) the first lens 106, the head-wearable apparatus 100 of the illustrated example employs a projection system 116. The projection system 116 of the illustrated example may be a projector or optical engine (e.g., a micro-projector, a pico-projector, a retina projector, retinal scan device, etc.) and/or any other projection system or image generator that is coupled with different types of relay optics placed in a field of view of a user that are used to redirect the projection light into a human eye of a user wearing the head-wearable apparatus. For example, the projection system 116 of the illustrated example interposes an image in a viewing angle of a user to enable the user wearing the head-wearable apparatus 100 to see the environment through the first lens 106 and/or the second lens 108 and see, simultaneously, imagery (e.g., digital imagery) across at least a portion of the first lens 106 generated by the projection system 116. In some examples, the image may appear (e.g., as a holographic image) between a user's eye and the first lens 106.

To project light and generate an image toward the first lens 106, the projection system 116 of the illustrated example includes an image generator 118. For example, the image generator 118 of the illustrated example emits and/or projects a spectrum or frequency of light in the Red, Green, and/or Blue (RGB) light spectrum toward the first lens 106. The frame 102 of the illustrated example carries or supports the image generator 118. Specifically, the image generator 118 of the illustrated example is positioned in a housing 120 that is coupled to the first stem 110. However, in other examples, the image generator 118 may be positioned on the first stem 110 and/or the housing 120 may be coupled to the frame 102. In other examples the image generator 118 may be positioned on or coupled to the second stem 112.

The image generator 118 of the illustrated example includes a light source 122 and a projector 124 to project light toward and/or on the first lens 106. In some examples, the light source 122 is a light emitting diode (LED). In some examples, the projector 124 may be a scanning mirror to reflect and redirect light from the light source 122 toward the first lens 106. In some examples, the scanning mirror may be a microelectromechanical system (MEMS) based scanning mirror. In some examples, the projection system 116 may be a panel micro display such as, for example, a liquid crystal display (LCD), a thin-film transistor display (TFT), a micro-electromechanical system display (MEMS), an organic light emitting diode (OLED), and/or any other projection system or image generator. In some examples, the image generator 118 and/or more generally the projection system 116 provides means for generating an image. In some examples, the frame 102 provides means for supporting or carrying the image generator 118 and/or more generally the projection system 116. In some examples, the frame 102 provides means for carrying the first pair of lenses 104 or the second pair of lenses 114.

To control one or more settings or parameters of the light source 122 and/or a position of the projector 124 (e.g., a scanning mirror), the projection system 116 of the illustrated example includes a controller 126. The controller 126 may be command an actuator to move or rotate a position of the projector 124 and/or may adjust (e.g., increase or decrease) one or more settings or parameters (e.g., a brightness) of the light source 122. In some examples, the controller 126 receives ambient light conditions from an optical sensor 128 positioned or coupled to the frame 102. Specifically, the optical sensor 128 is positioned on an outer surface of the frame 102 and oriented in a direction away from a user when a user is wearing the head-wearable apparatus 100. The head-wearable apparatus 100 of the illustrated example includes a speaker 127. The controller 126 may adjust (e.g., increase or decrease) a volume of the speaker 127.

To provide electrical power to the image generator 118, the head-wearable apparatus 100 includes a power source 130. The power source 130 of the illustrated example is a battery (e.g., a rechargeable lithium ion battery). The frame 102 of the illustrated example may include one or more cavities or channels to receive (e.g., route) electrical contacts, electrical wires, and/or other electrical circuitry to electrically couple the power source 130 and the image generator 118. In some examples, the power source 130 may be integrated with the image generator 118.

To provide a projection surface on which an image is to be displayed, (e.g., at least a portion of) the first lens 106 of the illustrated example includes a reflective surface or reflective material 132. The reflective material 132 of the illustrated example can display an image or graphic when light (e.g., a spectrum or frequency of light in the Red, Green, Blue (RGB) light spectrum) projects from the image generator 118 towards or onto the reflective material 132 of the first lens 106. In some examples, the image generator 118 overlays or interposes an image (e.g., holographic image) in a portion (e.g., an area) that is within a perimeter defined by the reflective material 132. The reflective material 132 of the first lens 106 may include, for example, a holographic film or holographic optical element (e.g., a transparent or semi-transparent holographic film) that provides a reflective surface for displaying a holographic image when the image generator 118 projects light on the reflective material 132. In some examples, although the entire surface area of the first lens 106 may include a holographic film or layer, only a portion of the first lens 106 (e.g., a holographic film) may be configured (e.g., recorded) to reflect a specific frequency (e.g., RGB frequency) of light provided by the image generator 118. In other examples a portion of the lens may be configured to reflect a range of frequencies (e.g. only G, but not R nor B). Thus, an image may overlay only a portion of a total area of the first lens 106 (e.g., the first lens) even when light from the image generator 118 projects across an entire surface area of the first lens 106. The reflective material 132 (e.g., the holographic film) may be encapsulated with the first lens 106, laminated with the first lens 106, and/or applied to the first lens 106 using any other suitable manufacturing technique(s). In some examples, the second lens 108 may include a reflective material (e.g., a holographic film). The first lens 106 and/or the second lens 108 may be formed from glass, plastic and/or any other suitable material(s). In some examples, the head-wearable apparatus 100 may include only one lens or a shield (e.g., a unitary lens, a one-piece glass or plastic lens) that extends between a first side 134a of the frame 102 and a second side 134b of the frame 102. In some examples, the reflective surface or reflective material 132 and/or more generally the first pair of lenses 104 (e.g., the first lens 106) provides first means for displaying an image, and the second pair of lenses 114 (e.g., the third lens 136) provides second means for displaying an image.

Typically, lenses of eyewear may have different characteristics. For example, the first pair of lenses 104 (e.g., the first lens 106 and/or the second lens 108) may have one or more first characteristic(s) (e.g., an optical characteristic) and the second pair of lenses 114 (e.g., a third lens 136 and/or a fourth lens 138) may have one or more second characteristic(s) (e.g., an optical characteristic) different than the first characteristic(s). As used herein, a characteristic or an optical characteristic of a lens includes, but is not limited to, a tint level, a color of tint, a prescription, a transparent or clear lens, a polarization feature, a sporting lens such as, for example, a cycling lens, reading prescription, visual prescription a location of the reflective material 132, etc.

For example, the first pair of lenses 104 may include different characteristics such as, for example, tint levels, different tint colors (e.g., green, yellow, brown, etc.) and/or polarization characteristics compared to the second pair of lenses 114. For example, the first pair of lenses 104 may include a first tint characteristic and the second pair of lenses 114 may include a second tint characteristic different from the first tint characteristic. As used herein, a tint characteristic may include various tint shades or tint levels including, but not limited to, zero percent tint (i.e., no tint shade or a clear lens), 20 percent tint, 40 percent tint, 80 percent tint and/or any other tint level or shade, and/or may include any color tint including, but not limited to, a grey tint, a blue tint, a brown tint, a yellow tint, a green tint, etc.

In some examples, the first pair of lenses 104 may be partially transparent, and the second pair of lenses 114 may be fully transparent. For example, the first pair of lenses 104 may have a 50% percent tint level, and 85% tint level, etc., and the second pair of lenses 114 may be 100% clear or transparent (e.g., no tint level). In some examples, the first pair of lenses 104 may include no vision correction characteristics (i.e., no prescription) and the second pair of lenses 114 may include vision correction (i.e., prescription lenses) characteristic(s). In some examples, the first pair of lenses 104 may be cycling lenses and the second pair of lenses 114 may be everyday lenses (e.g., fully transparent or clear lenses). In some examples, the first characteristic of the first lens 106 may include, for example, a first location or size of the reflective material 132 and the second characteristic of the third lens 136 may include, for example, a second location or size of a reflective material 132' of the third lens 136. For example, a cycling lens may include a reflective material closer to a peripheral edge of a lens and an everyday lens may include a reflective material closer to a center of the lens. In some examples, a characteristic of the lens 106 may include a first curvature (e.g., based on a first prescription) and a characteristic of the second lens 136 may include a second curvature (e.g., based on a second prescription) different than the first curvature.

As noted above, the first pair of lenses 104 of the illustrated example are removably coupled to the frame 102. To this end, the first pair of lenses 104 may be interchangeable with the second pair of lenses 114. For example, the first pair of lenses 104 having the first characteristic may be interchanged with a second pair of lenses 114 having a second characteristic different than the first characteristic. In this manner, a user may employ the first pair of lenses 104 for an activity (e.g., an outdoor activity in sunlight) that requires the first characteristic (e.g., 80% tint level) provided by the first pair of lenses 104 and may employ the second pair of lenses 114 for an activity (e.g., an indoor activity with no sunlight) that requires the second characteristic (e.g., a clear or transparent lens having zero percent tint level) provided by the second pair of lenses 114.

As noted above, the characteristics of lenses employed with the head-wearable apparatus 100 may affect a quality of a projected image on the lens (e.g., the first lens 106). As such, for example, a user may correctly perceive a projected image when the first pair of lenses 104 having a first characteristic (e.g., a first tint level) is coupled to the frame 102 and the user may not correctly perceive a projected image when the second pair of lenses 114 having a second characteristic (e.g., a second tint level different than the first tint level of the first pair of lenses 104) is coupled to the frame 102. For example, one or more settings or parameters of the projection system 116 may need to be adjusted to enable a user to correctly perceive the projected image when the first pair of lenses 104 are coupled to the frame 102 or second pair of lenses 114 are coupled to the frame 102.

To identify or distinguish between different lenses (e.g., the first pair of lenses 104 and the second pair of lenses 114) coupled to the frame 102, the head-wearable apparatus 100 of the illustrated example employs a lens identification system 140. Specifically, to identify or distinguish between different lenses (e.g., the first pair of lenses 104 and the second pair of lenses 114), the lens identification system 140 of the illustrated example employs a detection mechanism 142. The detection mechanism 142 of the illustrated example receives an input code representative of one or more characteristics of a lens (e.g., the first pair of lenses 104) when a lens is coupled or attached to the frame 102. The detection mechanism 142 of the illustrated example includes an identifier 144 and a reader 146.

In the illustrated example, the identifier 144 is formed or positioned on the first lens 106 of the first pair of lenses 104. Specifically, the identifier 144 of the first lens 106 of the illustrated provides a first input code representative of the first characteristic of the first pair of lenses 104. Additionally, the third lens 136 of the illustrated example includes an identifier 144' that provides a second input code representative of the second characteristic of the second pair of lenses 114. The identifier 144' of the third lens 136 of the illustrated example is different than the identifier 144 of the first lens 106 and, thus, provides a second input code that is different than the first input code. For example, the identifier 144 of the first lens 106 generates a first input code when coupled to the frame 102 and the identifier 144' of the third lens 136 generates a second input code when coupled to the frame 102.

To read the first input code provided by the identifier 144 of the first pair of lenses 104 or the second input code provided by the identifier 144' of the second pair of lenses 114, the detection mechanism 142 of the illustrated example employs the reader 146. Specifically, the reader 146 of the illustrated example reads the first input code of the first lens 106 provided by the identifier 144 when the first lens 106 is coupled to the frame 102 and the reads the second input code provided by the identifier 144' when the third lens 136 is coupled to the frame 102. The reader 146 of the illustrated example is formed, provided in, or otherwise located in the frame 102. In some examples, neither the identifier 144, 144' nor the reader 146 are visible from an outer surface of the frame 102 when the first pair of lenses 104 or the second pair of lenses 114 are coupled to frame 102. In other words, the identifier 144, 144' and the reader 146 of the illustrated example are positioned within (e.g., a cavity of) or recessed relative to the frame 102 when the first pair of lenses 104 or the second pair of lenses 114 are coupled to frame 102. In some examples, the reader 146 may be flush mounted with the frame 102 or may project from an outer surface of the frame 102.

The identifier 144 of the illustrated example is formed on the first lens 106 of the first pair of lenses 104 and the identifier 144' of the illustrated example is formed on the third lens 136 of the second pair of lenses 114. Thus, the reader 146 of the illustrated example is located adjacent the first side 134a of the frame 102. However, in some examples, the identifier 144 may be provided on both the first lens 106 and the second lens 108 and the identifier 144' may be provided on both the third lens 136 and the fourth lens 138. In some such examples, the head-wearable apparatus 100 of the illustrated example may employ a second reader (e.g., similar to the reader 146) adjacent the second side 134 of the frame 102 that can read the identifier 144 of the second lens 108 when the second lens 108 is coupled to the frame 102 and the identifier 144' of the fourth lens 138 when the fourth lens 138 is coupled to the frame 102. In such examples, the head-wearable apparatus 100 of the illustrated example provides verification to ensure that both the first lens 106 and the second lens 108 coupled to the frame 102 employ the same characteristics. Such a configuration prevents mixing the second lens 108 from the first pair of the lenses 104 with the fourth lens 138 of the second pair of lenses 114.

The lens identification system 140 of the illustrated example identifies or determines one or more first characteristic(s) of the first pair of lenses 104 based on the first input code and one or more second characteristic(s) of the second pair of lenses 114 based on the second input code. In some examples, the first input code and/or the second input code may represent a binary value (e.g., on/off), a digital value, and/or an analog value, and/or any other signal that may be processed by the lens identification system 140. In examples disclosed herein, means for classifying one or more characteristic(s) may be implemented by the identifier 144, 144', the reader 146 and/or more generally the detection mechanism 142 of FIG. 1.

Upon determining the first characteristics or the second characteristics, the lens identification system 140 of the illustrated example adjusts one or more settings or parameters of the projection system 116. For example, the lens identification system 140 of the illustrated example may cause the controller 126 to adjust (e.g., increase or decrease) a brightness level of the image generator 118 to a first setting when the lens identification system 140 identifies the first pair of lenses 104 coupled to the frame 102 and adjust (e.g., increase or decrease) the brightness level to a second setting different than the first setting when the lens identification system 140 identifies the second pair of lenses 114 coupled to the frame 102. As such, the head-wearable apparatus 100 of the illustrated example enables automatization and/or synchronization of one or more parameter(s) or setting(s) of the projection system 116 based on one or more lens characteristic(s) identified by the lens identification system 140. To this end, the head-wearable apparatus 100 of the illustrated example automatically synchronizes the projection system parameters as a function of lens type (e.g., the first characteristic of the second characteristic) without user input.

Additionally, the lens identification system 140 of the illustrated example detects the presence and/or absence of lenses relative to the frame 102. For example, when interchanging the first pair of lenses 104 with the second pair of lenses 114, both the first and second pairs of lenses 104 and 114 may be removed from the frame 102 at a given instance. In other words, the lens identification system 140 of the illustrated example, via the detection mechanism 142, detects when neither the first pair of lenses 104 (e.g., the first lens 106) nor the second pair of lenses 114 (e.g., the third lens 136) are coupled to the frame 102. To this end, the lens identification system 140 of the illustrated example interrupts or removes power to the projection system 116 from the power source 130. In this manner, the lens identification system 140 of the illustrated example conserves power when a lens is not coupled to the frame 102. Additionally, the lens identification system 140 of the illustrated example improves comfort and/or safety by avoiding stray projections of light (e.g., laser light) from the image generator 118 when a lens is not coupled to the frame 102. Further, by deactivating the projection system 116 when a lens is not detected or coupled to the frame 102, impact of stress and/or strain caused by removably coupling the lenses (e.g., inserting the first lens 106) relative to the frame 102 may be reduced by stopping operation of all moving parts (e.g., a scanning mirror) of the projection system 116 when the lenses are being coupled to, or removed from, the frame 102.

Figure 2:
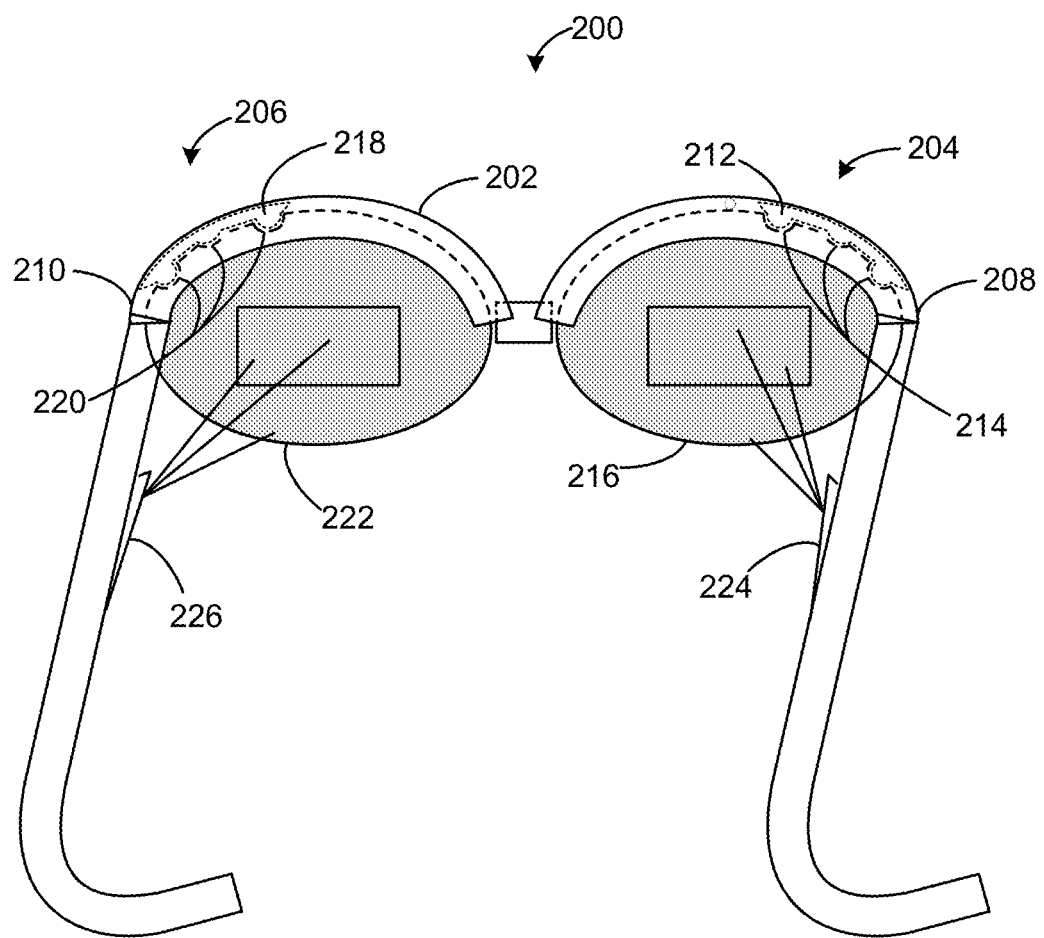
FIG. 2 illustrates another example head-wearable apparatus disclosed herein.

FIG. 2 illustrates another example head-wearable apparatus 200 disclosed herein. The head-wearable apparatus 200 of the illustrated example includes a frame 202 having a first detection mechanism 204 and a second detection mechanism 206. The first detection mechanism 204 of the illustrated example is positioned adjacent a first side 208 of the frame 202 and the second detection mechanism 206 is positioned adjacent a second side 210 of the frame 202. The first detection mechanism 204 of the illustrated example includes a first reader 212 to read a first identifier 214 (e.g., a first code) of a first lens 216. The second detection mechanism 206 of the illustrated example includes a second reader 218 to read a second identifier 220 (e.g., a second code) of a second lens 222. Thus, each of the first lens 216 and the second lens 222 of the illustrated example provides an input code to a lens identification system (e.g., the lens identification system 140 of FIG. 1). In some examples, the first and second detection mechanism 204 and 206 of the head-wearable apparatus 200 of the illustrated example provide verification that the first lens 216 and the second lens 222 that are coupled to the frame 202 employ the same characteristic(s).

In some examples, the head-wearable apparatus 200 of the illustrated example may include a first projection system 224 (e.g., the projection system 116 of FIG. 1) to project an image on the first lens 216 and a second projection system 226 (e.g., the projection system 116 of FIG. 1) to project an image on the second lens 222. In some such examples, the first lens 216 may have a first characteristic and a second lens 222 may have a second characteristic different than the first characteristic. To this end, the first detection mechanism 204 may identify the first characteristic of the first lens 216 and the second detection mechanism 206 may identify the second characteristic of the second lens 222. In this manner, the lens identification system may adjust one or more parameters of the first projection system 224 based on the first characteristic(s) of the first lens 216 and may adjust one or more parameters of the second projection system 226 based on the second characteristic(s) of the second lens 222. In some examples, the head-wearable apparatus 200 of the illustrated example may include the first and second detection mechanisms 204 and 206 and may not include the second projection system 226 (i.e., may include only the first projection system 224).

FIGS. 3-12 illustrate detection mechanisms 300-1200 that may be used to employ the detection mechanism 142 of FIG. 1 and/or the first and second detection mechanisms 204 and 206 of FIG. 2.

Figure 3:
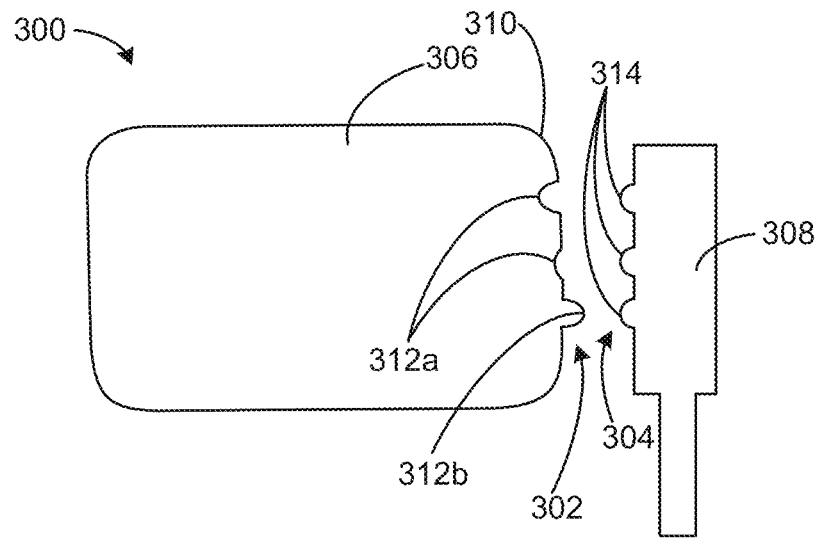
FIGS. 3-12 illustrate example lens detection mechanisms that may be used to implement the example head-wearable apparatus of FIGS. 1 and 2.

Referring to FIG. 3, the detection mechanism 300 of the illustrated example is a mechanical detection mechanism. The detection mechanism 300 of the illustrated example includes an identifier 302 and a reader 304. The identifier 302 of the illustrated example is formed with or otherwise located on a lens 306 that can be removably coupled to a frame 308 of a head-wearable apparatus (e.g., the head-wearable apparatus 100 of FIG. 1 and/or the head-wearable apparatus 200 of FIG. 2). The reader 304 of the illustrated example is located on the frame 308 of the head-wearable apparatus.

The identifier 302 of the illustrated example is formed at a peripheral edge 310 (e.g., a side edge) of the lens 306. The identifier 302 of the illustrated example includes a combination of one or more notches 312a (e.g., teeth) and a protrusion 312b positioned or formed along a portion of the peripheral edge 310 of the lens 306. Although only one protrusion 312b is shown in the illustrated example, in some examples, the identifier 302 of the illustrated example may include a plurality of protrusions 312b. The notches 312a and the protrusion 312b of the illustrated example provide or form a pattern representative of a characteristic (e.g., a tint level, a prescription, etc.) of the lens 306 In some examples, the identifier 302 of the illustrated example may include the notches 312a without the protrusion 312b to provide or form a pattern representative of a characteristic of the lens 306. In some examples, the identifier 302 of the illustrated example may include one or more protrusions 312b without the notches 312a to define a pattern representative of a characteristic of the lens 306. The notches 312a and/or the protrusion 312b of the illustrated example may be formed during manufacturing of the lens 306. For example, the notches 312a and/or the protrusion 312b may be integrally formed with the lens 306 (e.g., via injection molding, additive manufacturing processes, etc.) and/or may be formed via a secondary manufacturing process (e.g., cutting, etc.).

The identifier 302 of the illustrated example engages the reader 304 when the lens 306 is coupled to the frame 308. The reader of the illustrated example includes one or more mechanical switches 314 (e.g., spring-loaded buttons). The mechanical switches 314 of the illustrated example interact with the notches 312a and the protrusion 312b of the lens 306 to generate an input code representative of the characteristic of the lens 306. For example, the mechanical switches move to an activated position (e.g., close a circuit) or a deactivated position (e.g., open a circuit) based on a pattern provided by the notches 312a and the protrusion 312b when the identifier 302 engages (e.g., directly contacts or touches) the reader 304.

To provide a pattern representative of one or more characteristic(s) of the lens 306, the notches 312a of the illustrated example may be formed with a first dimensional characteristic (e.g., a first depth) or a second dimensional characteristic (e.g., a second depth) different than the first dimensional characteristic. In other words, the notches 312a formed with the first dimensional characteristic cause the mechanical switches 314 to move to the deactivated position and the notches 312a formed with the second dimensional characteristic cause the mechanical switches 314 to move to the activated position. The protrusion 312b protrudes from the edge of the lens 306 to cause activation of the mechanical switch 314 aligned with the protrusion 312b. Thus, an input code representative of the characteristic of the lens 306 provided by the identifier 302 is generated based on a pattern of the mechanical switches 314 that move to the activated position and/or the deactivated position when the identifier 302 engages the reader 304.

For example, the reader 304 of the illustrated example includes three mechanical switches 314. Thus, the reader 304 of the illustrated example can identify up to seven different input codes or patterns representative of seven different lens types (e.g., provided by a combination of different notches formed on the lens 306). Additionally, the reader 304 of the illustrated example may determine that the lens 306 is not present or coupled to the frame 308 when all three of the mechanical switches 314 are in a deactivated or non-depressed condition.

In some examples, to enable a single switch of the reader 304 to identify more than two conditions (e.g., an off condition and an on condition), the mechanical switches 314 and/or the pattern of the notches 312a (e.g., a depth of the notches) and/or the protrusion 312b of the illustrated example may be configured to provide different levels of activation. For example, each mechanical switch 314 may be configured to provide four different outputs (e.g., a fully deactivated position, a first partially activated, a second partially activated position, and a fully activated position). In some such examples, the mechanical switches 314 of the illustrated example can identify more than 7 different patterns. For example, the notches 312a and/or the protrusions 312b of the identifier 302 may be formed to cause the mechanical switches 314 to move to different positions. For example, a respective one of the notches 312a and/or protrusion 312b of the identifier 302 may cause a respective one of the mechanical switches 314 to move to a first (e.g., 50%) activated position that may be distinguishable from a respective one of the notches 312a (e.g., or another protrusion) that causes a respective one of the mechanical switches 314 to move to a second (e.g., 25%) activated position. In some examples, the reader 304 may include only one mechanical switch 314, two mechanical switches 314 or more than two mechanical switches 314.

Figure 4:
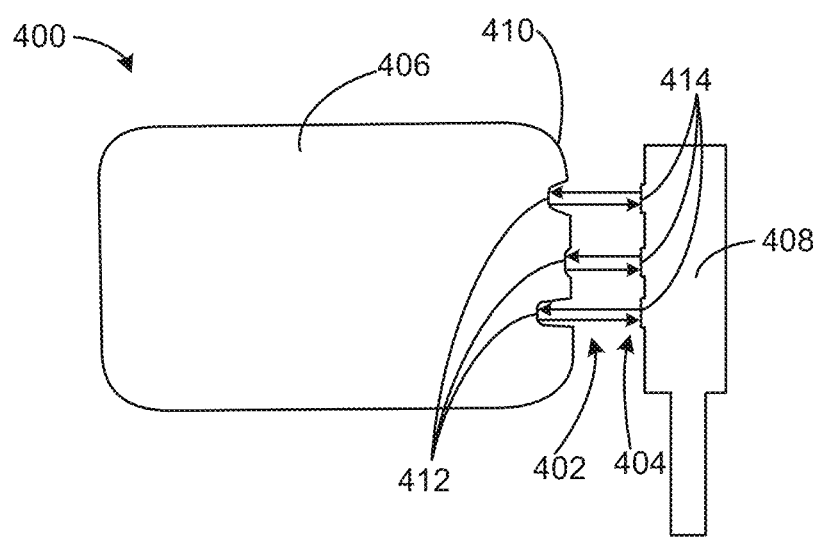

FIG. 4 illustrates another example detection mechanism 400 disclosed herein. The detection mechanism 400 of the illustrated example includes an identifier 402 and a reader 404. The identifier 402 of the illustrated example is formed with or located on a lens 406 that can be removably coupled to a frame 408 of a head-wearable apparatus. Specifically, the identifier 402 of the illustrated example is formed or located on a peripheral edge 410 of the lens 406. The reader 404 of the illustrated example is disposed on or encased inside the frame 408 of the head-wearable apparatus. The identifier 402 of the illustrated example includes a plurality of notches 412 that define a pattern representative of a characteristic of the lens 406. To generate an input code representative of the characteristic of the lens 406, one or more of the notches 412 of the illustrated example may be formed with different depths, sizes and/or shapes. For example, each of the notches 412 of the illustrated example includes a different depth.

The reader 404 of the illustrated example is an optical reader. For example, the reader 404 of the illustrated example includes a plurality of proximity sensors 414 positioned on and/or in the frame 408 (e.g., flush mounted or completely positioned inside the frame 408). To detect or read the pattern provided by the identifier 402, respective ones of the proximity sensors 414 project light (e.g., via an infrared emitter) toward the identifier 402 (e.g., the respective ones of the notches 412) and sense (e.g., via a photo detector or photodiode) a reflected light. Based on a presence or absence of a notch (e.g., one of the notches 412) at the peripheral edge 410 of the lens 406 (e.g., determined by an intensity and/or a time between projection of light by an emitter and detection of the reflected light by a photodiode), the reader 404 of the illustrated example determines the input code provided by the identifier 402. For example, the different depths provided by the notches 412 affect the intensity and/or time of the reflected light sensed by the proximity sensor 414. Thus, the notches 412 may be formed with different depths to provide different patterns representative of different input codes. Additionally, a respective one of the proximity sensors 414 can detect a plurality of different depths per notch. Thus, the proximity sensors 414 of the illustrated example can detect a plurality of different input codes. In some examples, the reader 404 may include one proximity sensor 414 and the identifier 402 may include one notch. To represent different characteristics of different lenses using only one notch, each lens can be provided with a notch having a different depth, size and/or shape.

Figure 5:
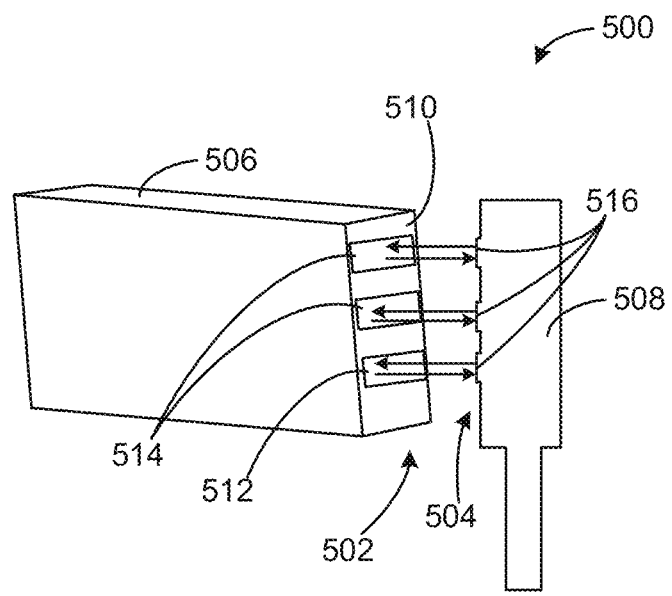

FIG. 5 illustrates another example detection mechanism 500 disclosed herein. The detection mechanism 500 of the illustrated example is an optical system. The detection mechanism 500 of the illustrated example includes an identifier 502 and a reader 504. The identifier 502 of the illustrated example is formed with a lens 506 that can be removably coupled to a frame 508 of a head-wearable apparatus. Specifically, the identifier 502 of the illustrated example is formed on a portion of a perimeter edge 510 (e.g., a side edge) of the lens 506. The identifier 502 of the illustrated example includes one or more reflective surfaces 512 and/or one or more absorptive surfaces 514. The one or more reflective surfaces 512 may include, for example, a polished surface, a white ink or metallic coating (e.g., metallization), etc. The one or more absorptive surfaces 514 may include, for example, a ground surface, a black ink, anodized (black) metallization, etc. The reader 504 of the illustrated example includes one or more optical detectors 516 formed on, and/or in, the frame 508 of a head-wearable apparatus. The reader 504 of the illustrated example may include a light source (e.g., a light emitting diode LED) and a photo detector (e.g. a photodiode). Thus, the one or more reflective surfaces 512 and/or the one or more absorptive surfaces 514 provide a pattern representative of a characteristic of the lens 506 when the optical detectors 516 read the one or more reflective surfaces 512 and/or the one or more absorptive surfaces 514 when the lens 506 is coupled to the frame 508. Different combinations or patterns of the one or more reflective surfaces 512 and/or the absorptive surfaces 514 may be employed to represent one or more characteristics of the lens 506.

Figure 6:
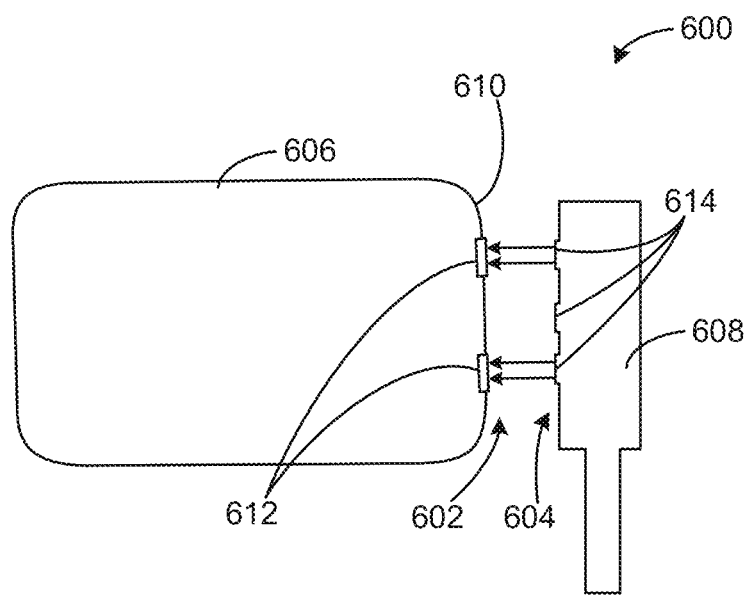

FIG. 6 illustrates another example detection mechanism 600 disclosed herein. The detection mechanism 600 of the illustrated example is an electrical switch. The detection mechanism 600 of the illustrated example includes an identifier 602 and a reader 604. The identifier 602 of the illustrated example is formed with a lens 606 that can be removably coupled to a frame 608 of a head-wearable apparatus. Specifically, the identifier 602 of the illustrated example is formed, positioned, attached or otherwise located adjacent a peripheral edge 610 of the lens 606. The identifier 602 of the illustrated example includes one or more conductive elements 612 (e.g., metal pads, electrical traces, etc.). The conductive elements 612 of the illustrated example may be attached to the peripheral edge of the lens via, for example, adhesive. In some examples, the conductive elements 612 may be printed on the lens 606. The one or more conductive elements 612 provide a pattern representative of a characteristic of the lens 606. The reader 604 of the illustrated example includes one or more contacts 614 (e.g., conductive contacts) that may be formed on and/or in the frame 608 of a head worn display apparatus. The one or more contacts 614 of the reader 604 engage (e.g., directly engage) or interact with the one or more conductive elements 612 of the lens 606 to generate an input code representative of the characteristic of the lens 606. For example, the reader 604 of the illustrated example having three contacts 614 may detect up to seven different input codes and may detect a presence or absence of the lens 606 relative to the frame 608. In some examples, a reader having four contacts 614 can detect, for example, up to 15 different types of patterns representative of lens characteristics and/or input codes.

Figure 7:
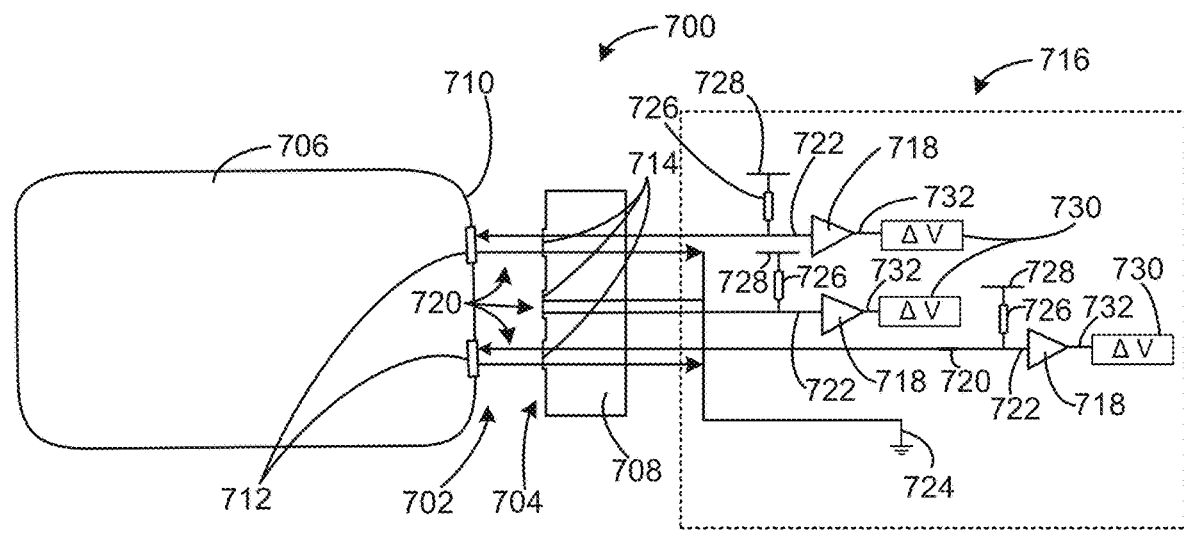

FIG. 7 illustrates another detection mechanism 700 disclosed herein. The detection mechanism 700 of the illustrated example includes an identifier 702 and a reader 704. The identifier 702 of the illustrated example is formed with a lens 706 that can be removably coupled to a frame 708 of a head-wearable apparatus. Specifically, the identifier 702 of the illustrated example is formed, positioned, attached or otherwise located adjacent a peripheral edge 710 of the lens 706. The identifier 702 of the illustrated example includes one or more electrical components 712 positioned adjacent the peripheral edge 710 of the first lens 106. In the illustrated example, the electrical components 712 are resistors. For example, different resistance values may be employed to generate different input codes representative of different lens characteristics. In some such examples, one or more resistors may be formed or positioned on the peripheral edge 710 of the lens 706 via, for example, thin film printing and/or other manufacturing technique(s). The reader 704 of the illustrated example includes one or more contact points 714. A respective one of the contact points 714 electrically couples or interacts with a respective one of the electrical components 712 to detect an input code associated with the identifier 702 of the lens 706.

Specifically, to determine the input code associated with the electrical components 712 of the first lens 106, the detection mechanism 700 of the illustrated example employs a logic circuit 716 (e.g., an analog circuit) that includes a plurality of logic gates 718. In the illustrated example, each contact point 714 includes a dedicated logic gate 718 to measure the resistance value of a respective one of the electrical components 712. Specifically, each contact point 714 provides a switch 720 to electrically couple a gate input 722 of the logic gate 718 to a ground 724 (e.g., a common ground) when the contact point 714 associated with the logic gate 718 electrically couples to (e.g., engages) a respective one of the electrical components 712. The switch 720 electrically decouples the logic gate 718 from the ground 724 when the contact point 714 associated with the logic gate 718 does not electrically couple to (e.g., does not engage) a respective one of the electrical components 712.

Each logic gate 718 of the illustrated example includes a pull-up resistor 726 to interface a signal input 728 (e.g., a reference voltage $V_{dd}$) to the gate input 722. When a respective one of the contact points 714 of the reader 704 engages a respective one of the electrical components 712 of the first lens 106, the switch 720 associated with the respective one of the contact points 714 electrically coupled to the respective one of the electrical components 712 closes a circuit to electrically couple the signal input 728 (e.g., a reference voltage ($V_{dd}$)) of the logic gate 718 associated with the respective one of the contact points 714 to the ground 724. When a respective one of the contact points 714 of the reader 704 does not engage a respective one of the electrical components 712 of the lens 706, the switch 720 associated with the respective one of the contact points 714 not in engagement with a respective one of the electrical components 712 is open (e.g., opens the circuit), and the signal input 728 of the logic gate 718 associated with the respective one of the contact points 714 is not coupled to ground 724 (e.g., the gate input 722 is pulled up to the level of the signal input (e.g., the reference voltage $V_{dd}$)).

The logic circuit 716 measures a signal output 730 (e.g., a voltage, a change in voltage, etc.) at a gate output 732 to determine the input code of the identifier 702. In some examples, the logic circuit 716 measures the signal output 730 of each logic gate 718 individually to determine one or more characteristic(s) of the lens 706. In some examples, the logic circuit 716 measures the signal outputs 730 of each logic gate 718 collectively (e.g., sums the signal outputs 730) to determine one or more characteristic(s) of the lens 706. In some examples, the logic circuit 716 may include an analog-to-digital converter to convert the measured signal output 730 (e.g., a voltage) to an input code representative of the characteristic associated with the lens 706. When the lens 706 is not inserted into the frame 708 and/or the contact points 714 do not electrically couple to any of the electrical components 712 (e.g., the switches 720 are all open), the signal output 730 reads a maximum reference value representing that no lens is coupled to the frame 708. In some examples, a trimmable resistor may be formed in the lens 706 so that the same trimmable resistor can be used for every lens type. The resistor may be trimmed during manufacturing of the lens 706.

Figure 8:
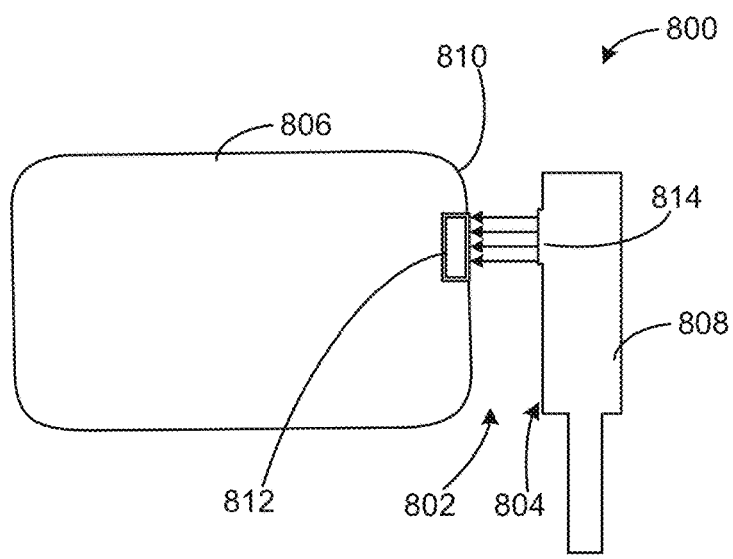

FIG. 8 illustrates yet another detection mechanism 800 disclosed herein. The detection mechanism 800 of the illustrated example includes an identifier 802 and a reader 804. The identifier 802 of the illustrated example is formed with a lens 806 that can be removably coupled to a frame 808 of a head-wearable apparatus. Specifically, the identifier 802 of the illustrated example is formed, positioned, attached or otherwise located adjacent a peripheral edge 810 of the lens 806. The identifier of the illustrated example includes a memory component 812. For example, the memory component 812 of the illustrated example may be a memory chip (e.g., an electrically erasable programmable read-only memory (EEPROM)). The input code representing information or characteristics of the lens 806 may be stored in the memory component 812. The reader 804 of the illustrated example is a memory reader 814 that reads the information from the memory component 812 when the lens 806 is coupled to the frame 808.

The memory component 812 of the illustrated example may be coupled to the peripheral edge 810 of the lens 806 via adhesive, pressure sensitive adhesive, tape, glue, etc. In some examples, the lens 806 of the illustrated example may include a recess 816 to receive the memory component 812 (e.g., a memory chip). The recess 816 of the illustrated example may be formed during manufacturing of the lens 806 or may be formed via secondary manufacturing process (e.g., cutting, etc.). Metal pads or contacts of the memory component 812 are oriented towards the reader 804 when the memory component 812 is coupled to the lens 806. In some examples, the memory component 812 may be placed on a flex printed circuit board (FPCB) and the FPCB may be coupled or wrapped around the peripheral edge 810 of the lens 806. In some examples, the memory component 812 of the illustrated example can be molded with the lens 806.

Figure 9:
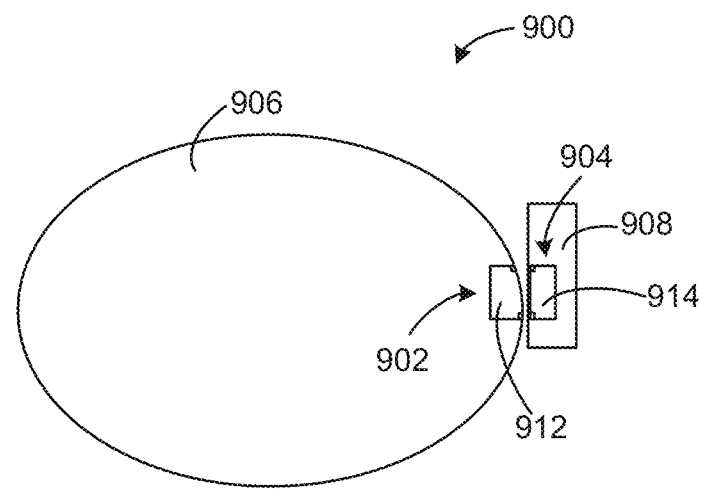

FIG. 9 illustrates yet another example detection mechanism 900 disclosed herein. The example detection mechanism 900 of the illustrated example includes an identifier 902 and a reader 904. The identifier 902 of the illustrated example is formed with a lens 906 that can be removably coupled to a frame 908 of a head-wearable apparatus. Specifically, the identifier 902 of the illustrated example is formed, positioned, attached or otherwise located adjacent a peripheral edge 910 of the lens 906. The identifier 902 of the illustrated example is a near field communication (NFC) memory 912. The characteristic(s) associated with the lens 906 of the illustrated example is stored in the NFC memory 912 of the lens 906. In some examples, the NFC memory 912 may be over molded with the lens 906 during manufacturing of the lens 906. The reader 904 is a near field communication antenna 914 (e.g., a chip inductor antenna) that is positioned in the frame 908 and configured to read the information from the NFC memory 912 of the lens 906.

In some examples, the identifier 902 may be a radio frequency identification device (RFID) tag and the reader 904 may be an RFID reader. The RFID tag may include the characteristic information of the lens 906 and is positioned or affixed (e.g., via adhesive) to an edge of the lens 906.

Figure 10:
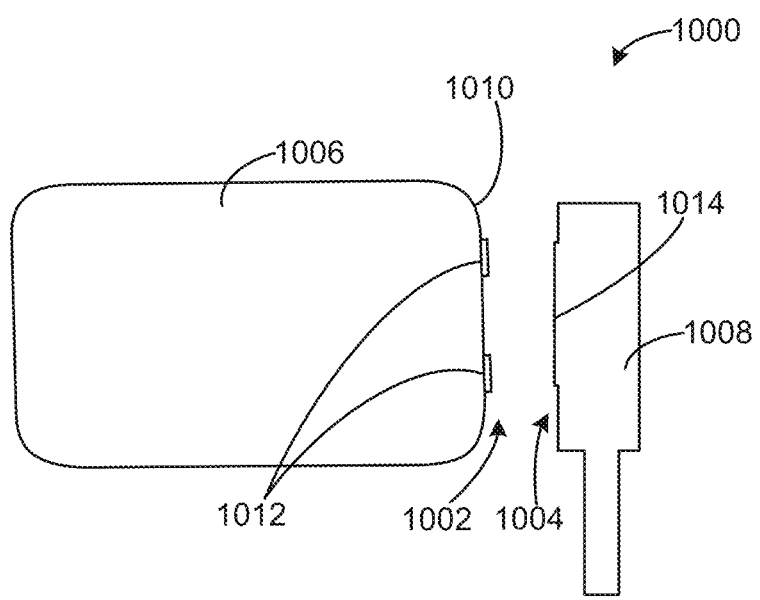

FIG. 10 illustrates yet another example detection mechanism 1000 disclosed herein. The example detection mechanism 1000 of the illustrated example includes an identifier 1002 and a reader 1004. The identifier 1002 of the illustrated example is coupled to a lens 1006 that can be removably coupled to a frame 1008 of a head-wearable apparatus. Specifically, the identifier 1002 of the illustrated example is positioned, attached or otherwise located adjacent a peripheral edge 1010 of the lens 1006. The identifier 1002 of the illustrated example include one or more magnets 1012 (e.g., a bulk magnet or a set of bulk magnets). The reader 1004 of the illustrated example includes a magnetic sensor (e.g., a reed switch, a hall effect sensor, etc.). Magnets having different magnetic values may be employed to represent different characteristics of the lens 1006.

Figure 11:
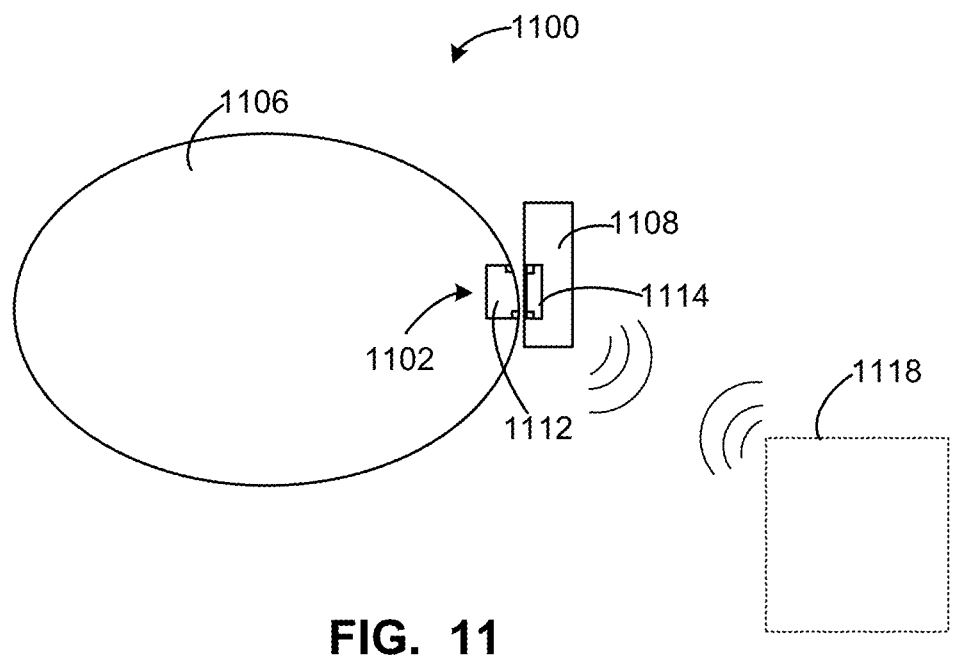

FIG. 11 illustrates yet another example detection mechanism 1100 disclosed herein. In contrast to the detection mechanisms 300-1000 discussed above, the detection mechanism 1100 of the illustrated example does not employ a reader on a frame 1108. The detection mechanism 1100 of the illustrated example employs an identifier 1104 to determine one or more characteristics of a lens 1106. Specifically, the identifier 1102 of the illustrated example includes a first portion 1112 positioned or located on the lens 1106 and a second portion 1114 positioned or located on the frame 1108. In some examples, the first portion 1112 (e.g., a memory) may be carried by (e.g., overmolded with or attached to) the lens 1106 and the second portion 1114 (e.g., an antenna) may be carried by (e.g., overmolded with or attached to) the frame 1108. To this end, the first portion 1112 may have a smaller dimensional footprint and, thus, reducing possible obstruction of a person's field of view when wearing the head-wearable apparatus and/or reducing a dimensional footprint of the lens 1106 and/or the frame 1108.

The first portion 1112 of the identifier 1104 of the illustrated example may include a memory device and the second portion 1114 of the illustrated example may include one or more contacts (e.g., a passive antenna). For example, the second portion 1114 of the illustrated example may be a passive chip antenna. In some examples, the first portion 1112 and the second portion 1114 of the illustrated example together form or define a near field communication identifier (e.g., a NFC tag). For example, the first portion 1112 may be an NFC memory carried by the lens 1106 and the second portion 1114 may be an NFC chip antenna in the frame 1108. When the lens 1106 is inserted or coupled in the frame 1108, both the first portion 1112 and the second portion 1114 combine to form an NFC identifier. Thus, the first portion 1112 (e.g., the memory device) of the illustrated example cannot communicate information or characteristic(s) of the lens 1106 without being communicatively coupled to the second portion 1114 of the identifier 1102.

Figure 12:
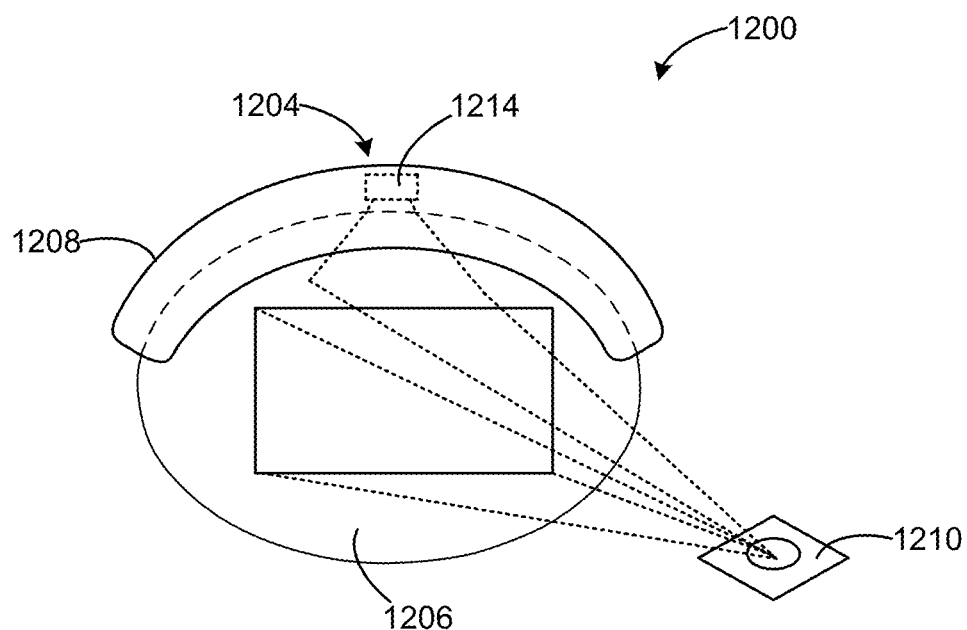

A separate device such as, for example, an external device 1118 (e.g., a reader) may read the information from the identifier 1102. The external device 1118 (e.g., a mobile device, a computer, etc.) may be communicatively coupled to a head-wearable apparatus (e.g., via an antenna provided by the second portion 1114). The identifier 1102 of the illustrated example can communicate the information or characteristic(s) of the lens 1106 to the external device 1118. In this manner, the external device 1118 may be employed to read the characteristic(s) of the lens 1106 and communicate the characteristic(s) to a controller (e.g., the controller 126 of FIG. 1) of a projection system (e.g., the projection system 116 of FIG. 1). In some examples, the external device 1118 may adjust (e.g., increase or decrease) one or more settings or parameters of the projection system based on the characteristic(s) of the lens 1106. FIG. 12 illustrates yet another example detection mechanism 1200 disclosed herein. In contrast to the detection mechanisms 300-1100 discussed above, the detection mechanism 1200 of the illustrated example does not employ an identifier on a lens 1206. The detection mechanism 1200 of the illustrated example employs a reader 1204 to determine one or more characteristics of the lens 1206. The reader 1204 of the illustrated example is an optical sensor 1214 positioned or coupled to a frame 1208 of a head-wearable apparatus. In some examples, the optical sensor 1214 may be employed by the optical sensor 128 of the frame 102 of FIG. 1. Thus, in some examples, the optical sensor 1214 of the illustrated example may be used by the head-wearable apparatus to measure ambient light conditions and adjust one or more parameters of a projection system accordingly.

During a startup sequence (e.g., when a projection system is activated), a projection system (e.g., via a scanning mirror) scans an entire area of the lens 1206 by projecting light from a projection system (e.g., the image generator 118) toward the lens 1206. The optical sensor 1214 of the illustrated example captures or reads a (e.g., a maximum) residual light that passes through the lens 1206 (e.g., toward an outer surface of the frame 1208). Based on a level of intensity of the residual light detected by the optical sensor 1214, a lens identification system can discriminate a tinted lens from a transparent lens. For example, a lens having a first tint characteristic (e.g., a tint level of 50%) may be determined when the residual light has a first intensity and the second tint characteristic (e.g., zero tint level) of a lens may be determined when the residual light has a second intensity different than the first intensity.

Although each example detection mechanisms 300-1200 described above have certain features, it should be understood that it is not necessary for a particular feature of one of the example detection mechanisms 300-1200 to be used exclusively with that example. Instead, any of the features of the example detection mechanisms 300-1200 described above and/or depicted in the drawings can be combined with any of the example detection mechanisms 300-1200, in addition to or in substitution for any of the other features of those examples. One example's features are not mutually exclusive to another example's features. Instead, the scope of this disclosure encompasses any combination of any of the features. In some examples, a detection mechanism disclosed in accordance with the teachings of this disclosure may have a combination of the identifiers 302-1102, the readers 304-1004, 1204, and/or more generally the detection mechanisms 300-1200 disclosed herein. In some examples, a detection mechanism disclosed herein may employ a mechanical detection system, an electrical detection system, an electrically erasable programmable read-only memory (EEPROM) and/or any combination thereof.

Figure 13:
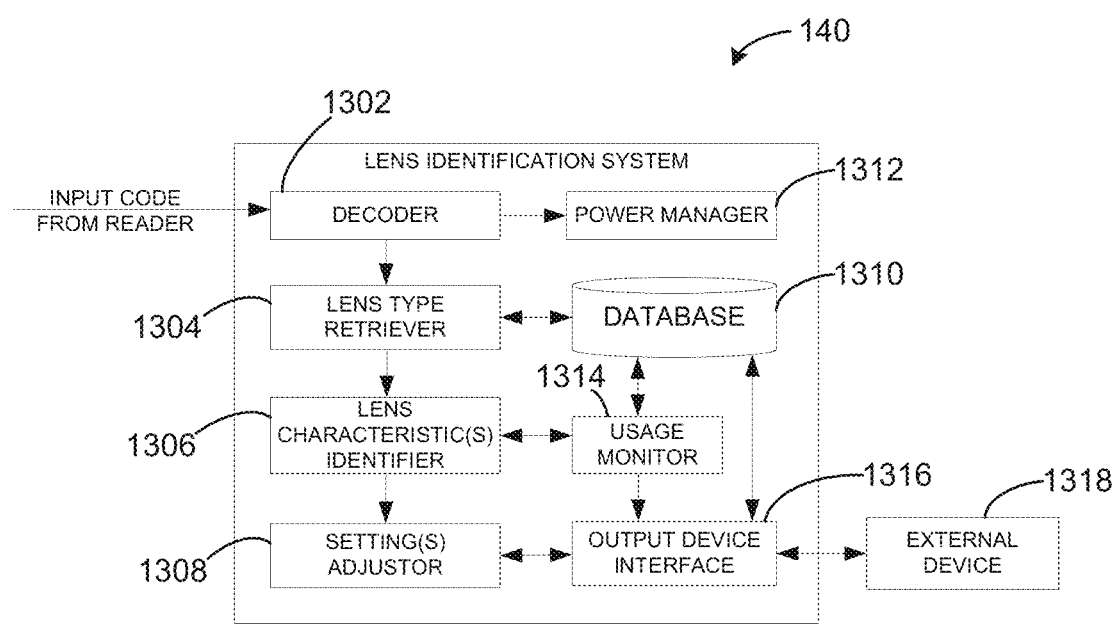
FIG. 13 is a block diagram of an example lens identification system that may implement the example head-wearable apparatus of FIG. 1 or the example head-wearable apparatus of FIG. 2.

FIG. 13 is a block diagram of an example lens identifier system that may implement the example head-wearable apparatus of FIG. 1 or the example head-wearable apparatus of FIG. 2. The lens identification system of the illustrated example includes an example decoder 1302, an example lens type retriever 1304, an example lens characteristic identifier 1306, an example setting adjustor 1308, an example database 1310, an example power manager 1312, an example usage monitor 1314, and an example output device interface 1316. The output device interface 1316 of the illustrated example may communicatively couple the lens identification system, and/or, more generally, the head-wearable apparatus to an external device 1318 such as, for example, a mobile phone, a computer, a server, and/or any other computing device. The example output device interface 1316 of the illustrated example may communicatively couple to the external device 1318 via a wired connection (e.g., a USB cable) or wirelessly (e.g., via Bluetooth communication, WIFI communication and/or any other communication protocol). For example, the external device 1318 may be a mobile phone tethered to the head-wearable apparatus 100.

The decoder 1302 of the illustrated example receives an input code (e.g., an electrical signal) the detection mechanism 142 when the first lens 106 is coupled to the frame 102 of the head-wearable apparatus 100 of FIG. 1. The input code is representative of a characteristic of the first lens 106 attached to the frame 102. In some examples, the input code from the detection mechanism 142 may be a binary value (e.g., on/off), a digital value, and/or an analog value and/or any other suitable signal that may be generated by the detection mechanism 142 of FIG. 1, the first and second detection mechanisms 204 and 206 of FIG. 2, and/or the detection mechanisms 300-1200 of FIGS. 3-12.

The lens type retriever 1304 of the illustrated example receives the decoded input signal from the decoder 1302 and retrieves a lens type from the database 1310 based on the decoded input signal. For example, the database 1310 may include an array (e.g., a look-up table) that includes a plurality of different types of lenses corresponding to or associated with a plurality of different input codes. For example, (e.g., a predetermined) input code-to-lens type look-up table may be stored in the database 1310. In such an example, a head-wearable apparatus manufacturer may provide the different input codes associated with the different lens types. In some examples, the input code and/or lens type may be stored in the database 1310 via the external device 1318 (e.g., a computer, a mobile device, etc.). In some examples, the lens type retriever 1304 may retrieve the lens type based on the decoded input code from the external device 1318 communicatively coupled to the head-wearable apparatus 100 via the output device interface 1316. In some such examples, the lens identification system 140 may not include the database 1310.

The lens characteristics identifier 1306 identifies a characteristic of the first lens 106 based on the lens type information obtained or retrieved by the lens type retriever 1304. For example, the lens characteristic identifier 1306 identifies a tint level of the first lens 106. The lens characteristic identifier 1306 communicates the characteristic of the first lens 106 to the setting adjustor 1308.

The setting adjustor 1308 of the illustrated example adjusts one or more settings of the projection system 116 based on the characteristic of the first lens 106 identified by the lens characteristic identifier 1306. In some such examples, the lens identification system 140 adjusts one or more parameters of the projection system 116 as a function of a characteristic of the first lens 106 coupled to the frame 102. For example, the setting adjustor 1308 of the illustrated example adjusts a brightness setting of the light source 122 of the projection system 116 based on a tint level identified by the lens characteristic identifier 1306.

The power manager 1312 of the illustrated example monitors the decoded input code provided by the decoder 1302 to detect the presence or absence of the first lens 106 relative to the frame 102. For example, the power manager 1312 of the illustrated example interrupts or removes power to the projection system 116 if the decoded input code is representative of an indication that no lens is coupled to or carried by the frame 102. If the power manager 1312 determines that the decoded input code from the decoder 1302 is representative of an indication that a lens (e.g., the first lens 106) is coupled to or carried by the frame 102, the power manager 1312 provides power to the projection system 116.

The usage monitor 1314 of the illustrated example may monitor lens usage and/or a user's behavior or habits. Lens usage information may be used to determine or predict maintenance and/or a replacement schedule of a lens. For example, pixels of certain lenses may have a predetermined operating life. Information regarding the hours a certain type of lens used may be employed to predict replacement and/or maintenance for the lens. In some examples, the usage monitor 1314 tracks a user's behavior or habits based on lens type. For example, the usage monitor 1314 may track an activity of the user based on the type of lens (e.g., a characteristic of the lens) coupled to or carried by the frame 102. For example, the head-wearable apparatus 100 of the illustrated example may track a user's activity when, for example, a cycling lens is detected with the head-wearable apparatus 100. In some examples, the head-wearable apparatus 100 may change a type of content to be displayed when, for example, a cycling lens or an everyday (e.g., fully transparent lens) is detected by the head-wearable apparatus 100. In some examples, the lens identification system 140 of the illustrated example may adjust (e.g., increase or decrease) one or more settings (e.g., a brightness of the projection system 116, a volume the speaker 127, etc.) when the lens identification system 140 identifies the cycling lens coupled to the frame 102. In some examples, the head-wearable apparatus 100 may interact with the external device 1318 based on the identified lens characteristic(s). For example, the head-wearable apparatus 100 of the illustrated example may automatically activate/deactivate features (e.g., do not disturb features) of the external device 1318 when a cycling lens is identified to prevent the external device 1318 from providing notifications or alerts when the external device 1318 receives incoming phone calls or text messages.

In examples disclosed herein, means for identifying one or more lens characteristic(s) may be implemented by the example lens identification system 140 of FIG. 13. In examples disclosed herein, means for identifying a first characteristic (e.g., a first tint characteristic) may be implemented by the decoder 1302, the lens type retriever 1304 and/or the lens characteristic identifier 1306. In examples disclosed herein, means for adjusting a setting (e.g., a brightness) of the image generator 118 may be implemented by the setting adjustor 1308. In examples disclosed herein, means for managing power to the projection system 116 (e.g., the image generator 118) may be implemented by the power manager 1312.

While an example manner of implementing the lens identification system 140 of FIG. 1 is illustrated in FIG. 13, one or more of the elements, processes and/or devices illustrated in FIG. 13 may be combined, divided, re-arranged, omitted, eliminated and/or implemented in any other way. Further, the example decoder 1302, the example lens type retriever 1304, the example lens characteristic identifier 1306, the example setting adjustor 1308, the example power manager 1310, the example database 1312, an example usage monitor 1314, and the example output device interface 1316 and/or, more generally, the example lens identification system 140 of FIG. 1 may be implemented by hardware, software, firmware and/or any combination of hardware, software and/or firmware. Thus, for example, any of the example decoder 1302, the example lens type retriever 1304, the example lens characteristic identifier 1306, the example setting adjustor 1308, the example power manager 1310, the example database 1312, an example usage monitor 1314, and the example output device interface 1316 and/or, more generally, the example lens identification system 140 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example decoder 1302, the example lens type retriever 1304, the example lens characteristic identifier 1306, the example setting adjustor 1308, the example power manager 1310, the example database 1312, an example usage monitor 1314, and the example output device interface 1316 and/or, more generally, the example lens identification system 140 of FIG. 1 is/are hereby expressly defined to include a non-transitory computer readable storage device or storage disk such as a memory, a digital versatile disk (DVD), a compact disk (CD), a Blu-ray disk, etc. including the software and/or firmware. Further still, the example lens identification system 140 of FIG. 1 may include one or more elements, processes and/or devices in addition to, or instead of, those illustrated in FIG. 13, and/or may include more than one of any or all of the illustrated elements, processes and devices.

Figure 14:
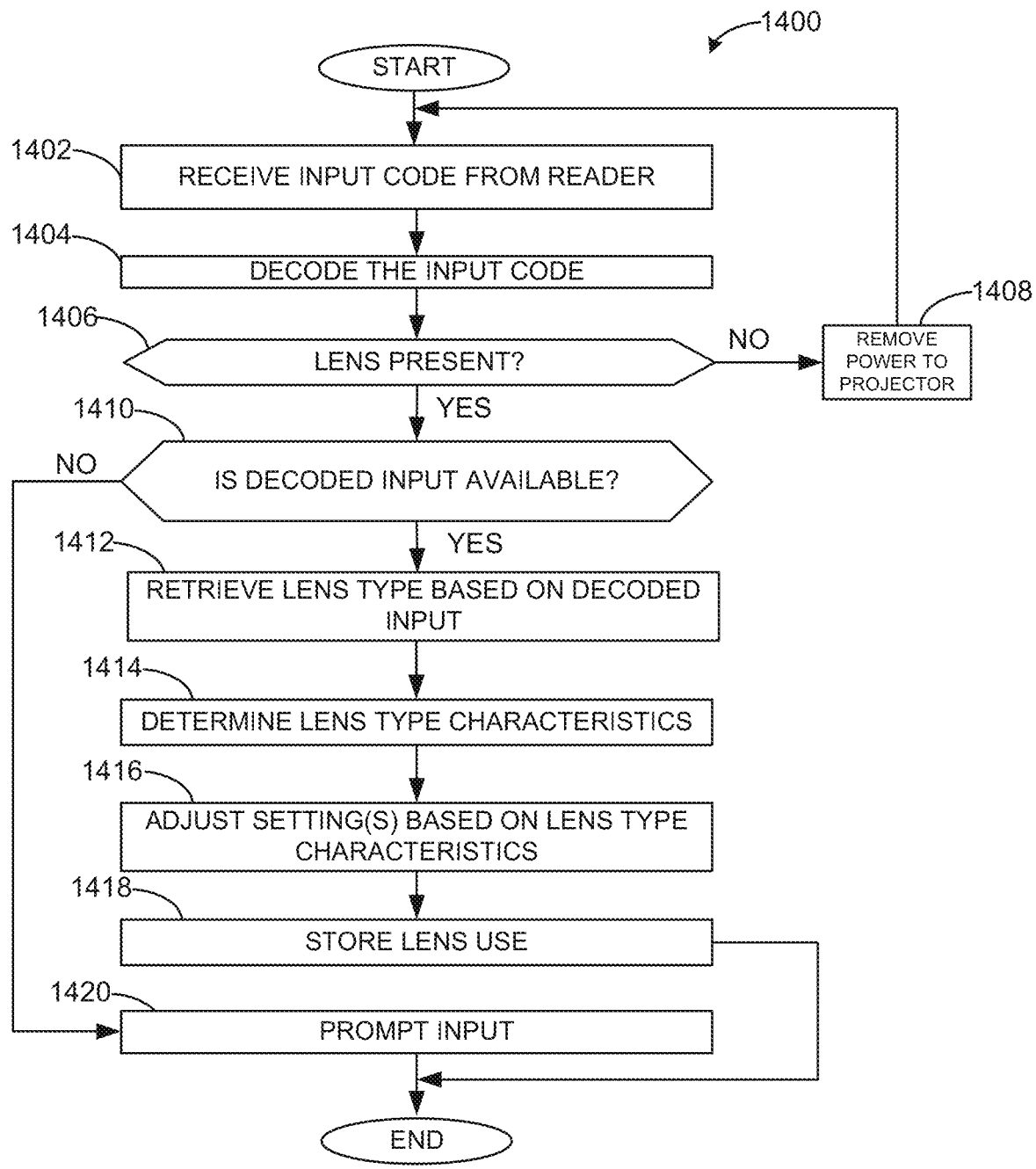
FIG. 14 is a flowchart representative of example machine readable instructions which may be executed to implement the example lens identification system of FIG. 13.

A flowchart representative of example machine readable instructions for implementing the lens identification system 140 of FIG. 13 is shown in FIG. 14. In this example, the machine readable instructions comprise a program for execution by a processor such as the processor 1512 shown in the example processor platform 1500 discussed below in connection with FIG. 15. The program may be embodied in software stored on a non-transitory computer readable storage medium such as a CD-ROM, a floppy disk, a hard drive, a digital versatile disk (DVD), a Blu-ray disk, or a memory associated with the processor 1512, but the entire program and/or parts thereof could alternatively be executed by a device other than the processor 1512 and/or embodied in firmware or dedicated hardware. Further, although the example program is described with reference to the flowchart illustrated in FIG. 15, many other methods of implementing the example lens identification system 140 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIG. 14 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

The program of FIG. 14 begins at block 1402 by the decoder 1302 receiving an input code from the reader 146. The decoder 1302 then decodes the input code (block 1404). The lens identification system 140 detects a presence of a lens relative to the frame 102 based on the decoded input code received (block 1406). For example, the lens identification system 140 determines at block 1406 that a lens is present when the first lens 106 is coupled to the frame 102 and the lens identification system 140 determines at block 1406 that a lens is not present when the first lens 106 is removed from the frame 102.

If the decoder 1302 determines at block 1406 that an input code from the reader 146 is indicative that no lens is present (e.g., no lens is coupled to the frame 102), the power manager 1312 removes power to the image generator 118 (block 1408). For example, the power manager 1312 prevents the image generator 118 from projecting light (e.g., an image) when the decoder 1302 determines that no lens is carried by the frame 102.

If the decoder 1302 determines at block 1406 that a lens is present, the lens type retriever 1304 determines if the coded input is available in the database 1310 (block 1410). The lens type retriever 1304 retrieves or obtains the lens type based on the decoded input code (block 1412). For example, the lens type retriever 1304 employs the decoded input code to retrieve the lens type from an input code-to-lens type mapping look-up table stored in the database 1310.

The lens characteristic identifier 1306 determines one or more characteristic(s) of the lens carried by the frame 102 based on the information provided by the lens type retriever 1304 (block 1414). For example, the lens characteristic identifier 1306 identifies one or more optical characteristics of the first lens 106. For example, the lens characteristic identifier 1306 may identify if a tint level of the first lens 106, a tint color of the first lens 106, a prescription of the first lens 106, a type of sporting lens, and/or any other optical characteristic that may affect an image of the projection system 116 and/or may require adjustment of one or more setting(s) of the projection system 116.

The setting adjustor 1308 adjusts a setting of the projection system 116 based on the identified lens characteristic(s) (block 1416). The usage monitor 1314 stores the lens type (e.g., in the database 1310) (block 1418). If the lens type retriever 1304 determines at block 1410 that the decoded input is not available in the database 1310, the lens identification system 140 prompts the user for an input (block 1420). For example, the lens identification system 140 may prompt a user to manually input the information or characteristic(s) of the lens carried by the frame 102. In some examples, a user may input the information via the external device (e.g., a smartphone) communicatively coupled to the lens identification system 140 or via a user input module of the head-wearable apparatus 100.

Figure 15:
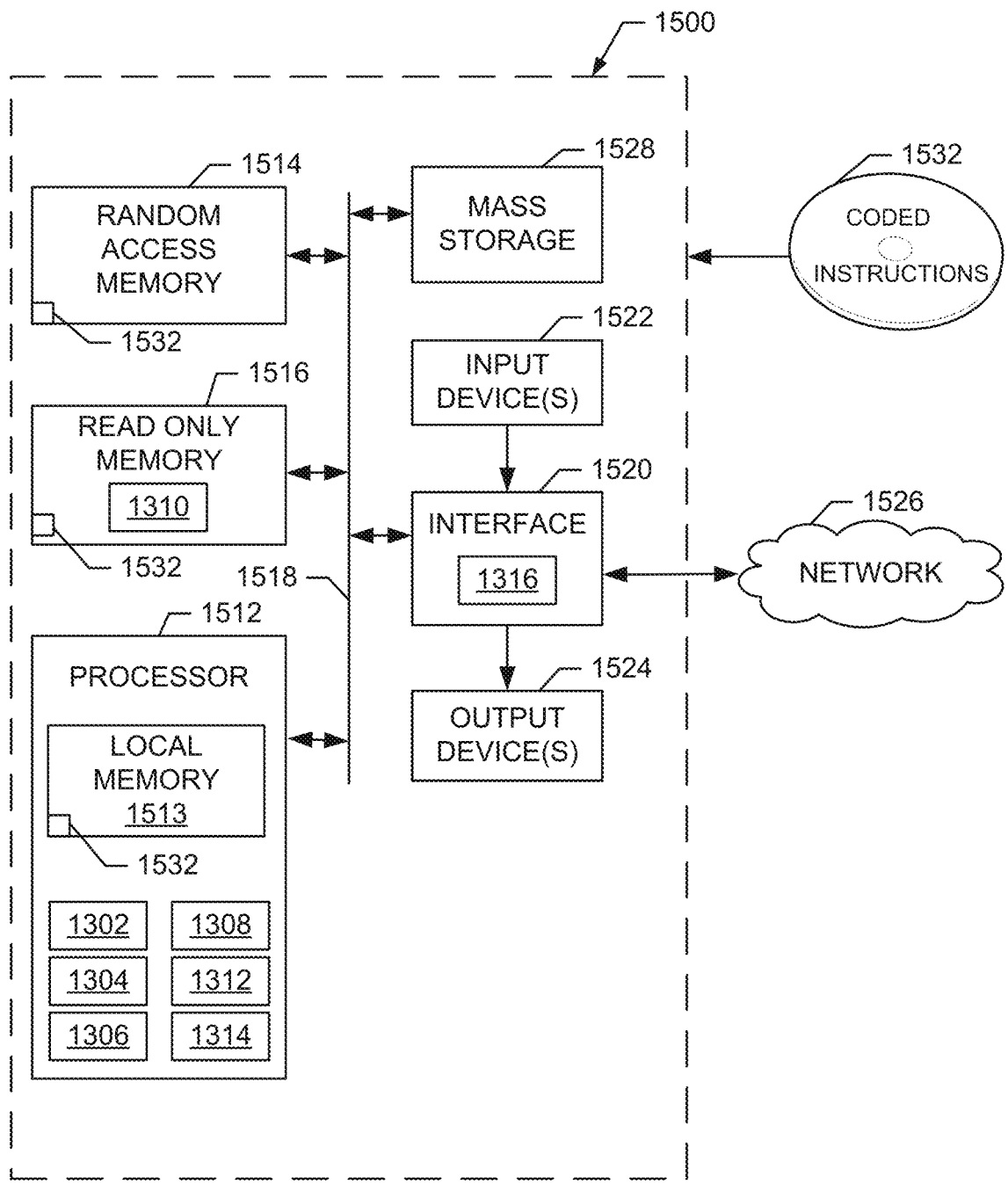
FIG. 15 is a block diagram of an example processor constructed in accordance with the teachings of this disclosure that may implement example restraint systems disclosed herein.

FIG. 15 is a block diagram of an example processor platform 1500 capable of executing the instructions of FIG. 14 to implement the apparatus of FIG. 13. The processor platform 1500 can be, for example, a server, a personal computer, a mobile device (e.g., a cell phone, a smart phone, a tablet such as an iPad™), a personal digital assistant (PDA), an Internet appliance, a gaming console, a personal video recorder, or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors or controllers from any desired family or manufacturer. The hardware processor may be a semiconductor based (e.g., silicon based) device. In this example, the processor implements the example decoder 1302, the example lens type retriever 1304, the example lens characteristic identifier 1306, the example setting adjustor 1308, the example power manager 1312, and/or the example usage monitor 1314.

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1516 may be implemented by flash memory and/or any other desired type of memory device. Access to the main memory 1514, 1516 is controlled by a memory controller. The database 1310 may be implemented by the non-volatile memory 1516.

The processor platform 1500 of the illustrated example also includes an interface circuit 1520. The interface circuit 1520 may be implemented by any type of interface standard, such as an Ethernet interface, a universal serial bus (USB), and/or a PCI express interface. The interface circuit may alternatively be implemented using a wireless interface standard, such as GSM, Bluetooth, WiFi, etc.

In the illustrated example, one or more input devices 1522 are connected to the interface circuit 1520. The input device(s) 1522 permit(s) a user to enter data and/or commands into the processor 1512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1520 of the illustrated example, thus, typically includes a graphics driver card, a graphics driver chip and/or a graphics driver processor.

The interface circuit 1520 of the illustrated example also includes a communication device such as a transmitter, a receiver, a transceiver, a modem and/or network interface card to facilitate exchange of data with external machines (e.g., computing devices of any kind) via a network 1526 (e.g., an Ethernet connection, a digital subscriber line (DSL), a telephone line, coaxial cable, a cellular telephone system, etc.).

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, RAID systems, and digital versatile disk (DVD) drives.

The coded instructions 1532 of FIG. 14 may be stored in the mass storage device 1528, in the volatile memory 1514, in the non-volatile memory 1516, and/or on a removable tangible computer readable storage medium such as a CD or DVD.

Example unmanned vehicles are disclosed. Further examples and combinations thereof include the following.

Example 1 may be glasses including a frame and an image generator coupled to the frame. A first lens is removably carriable by the frame. The first lens has a first identifier to provide a first code representative of a first optical characteristic of the first lens. The image generator is to project an image toward the first lens when the first lens is carried by the frame. A reader is to read the first code when the first lens is carried by the frame.

Example 2 includes the glasses of example 1, further including a processor to identify the first optical characteristic based on the first code.

Example 3 includes the glasses of any one of examples 1-2, wherein the processor is to adjust a first parameter of the image generator to a first setting in response to identifying the first code.

Example 4 includes the glasses of any one of examples 1-3, further including a second lens removably carriable by the frame, the second lens being interchangeable with the first lens, the second lens having a second identifier to provide a second code representative of a second optical characteristic of the second lens, the image generator to project the image toward the second lens when the second lens is carried by the frame, the reader to read the second code when the second lens is carried by the frame.

Example 5 includes the glasses of any one of examples 1-4, wherein the first optical characteristic is a first tint characteristic and the second optical characteristic is a second tint characteristic different than the first tint characteristic.

Example 6 includes the glasses of any one of examples 1-5, wherein the processor is to adjust the first parameter to a second setting different than the first setting in response to identifying the second code.

Example 7 includes the glasses of any one of examples 1-7, wherein the first tint characteristic is representative of the first lens being a clear lens, and the second tint characteristic is representative of the second lens being a tinted lens.

Example 8 includes the glasses of any one of examples 1-7, wherein the first tint characteristic defines at least one of a first tint level or tint color classification of the first lens and the second tint characteristic defines at least one of a second tint level or color classification of the second lens, the first tint level being different than the second tint level.

Example 9 includes the glasses of any one of examples 1-8, wherein the first tint characteristic includes at least one of a grey lens, a yellow lens, a brown lens or a polarized lens, and the second tint characteristic includes a different one of the at least grey lens, the yellow lens, the brown lens or the polarized lens.

Example 10 includes the glasses of any one of examples 1-9, further including a power manager, the power manager to remove power to the image generator when the reader does not read either the first code or the second code.

Example 11 includes the glasses of any one of examples 1-10, wherein the first lens includes a notch located adjacent a perimeter of the first lens, the notch being representative of the first code.

Example 12 includes the glasses of any one of examples 1-11, wherein the notch is formed via a groove.

Example 13 includes the glasses of any one of examples 1-12, wherein the reader includes a switch having a depressible button to engage or identify the notch.

Example 14 includes the glasses of any one of examples 1-13, wherein the reader includes an optical sensor to detect the notch of the first lens.

Example 15 includes the glasses of any one of examples 1-14, wherein the first lens includes at least one of a reflective surface or an absorptive surface located adjacent a perimeter of the first lens, at least one of the reflective surface or the absorptive surface being representative of the first code.

Example 16 includes the glasses of any one of examples 1-15, wherein the reader includes an optical detector to detect the at least one of reflective surface or absorptive surface of the first lens.

Example 17 includes the glasses of any one of examples 1-16, wherein the first lens includes one or more conductive traces located adjacent an edge of the first lens, the one of the one or more conductive traces being representative of the first code.

Example 18 includes the glasses of any one of examples 1-17, wherein the reader includes one or more electrical conductive pads to detect the one or more conductive traces of the first lens.

Example 19 includes the glasses of any one of examples 1-18, wherein the first lens includes one or more magnets located adjacent a perimeter of the first lens, the one or more magnets being representative of the first code.

Example 20 includes the glasses of any one of examples 1-19, wherein the reader includes a magnetic sensor to detect the one or more magnets of the first lens.

Example 21 may be a head-wearable apparatus including means for generating an image; means for supporting the means for generating the image; first means for displaying the image generated by the image generating means, the first displaying means having first means for classifying a first tint characteristic of the first displaying means; second means for displaying the image generated by the image generating means, the second displaying means having second means for classifying a second tint characteristic of the second displaying means, the first tint characteristic being different than the second tint characteristic, the first displaying means being interchangeable with the second displaying means, wherein the image generating means is to project an image adjacent the first displaying means when the first displaying means is coupled to the supporting means or the second displaying means when the second displaying means is coupled to the supporting means; and means for reading the first classifying means when the first displaying means is coupled to the supporting means or the second classifying means when the second displaying means is coupled to the supporting means Example 22 includes the head-wearable apparatus of example 21, further including means for identifying the first classifying means or the second classifying means.

Example 23 includes the head-wearable apparatus of any one of examples 21-22, further including means for adjusting a brightness of the image generating means based on at least one of the first tint characteristic or the second tint characteristic identified by the identifying means.

Example 24 includes the head-wearable apparatus of any one of examples 21-23, wherein the brightness adjusting means is to adjust the brightness of the image generating means to a first setting in response to the identifying means identifying the first tint characteristic, and the brightness adjusting means is to adjust the brightness to a second setting different than the first setting in response to identifying means identifying the second tint characteristic.

Example 25 includes the head-wearable apparatus of any one of examples 21-24, further including a means for managing power to the image generating means, the power managing means to remove power to the image generating means when the reader means does not read the first classifying means or the second classifying means.

Example 26 includes the head-wearable apparatus of any one of examples 21-25, wherein the first tint characteristic is representative of the first displaying means being a clear lens, and the second tint characteristic is representative of the second displaying means being a tinted lens.

Example 27 includes the head-wearable apparatus of any one of examples 21-26, wherein the first tint characteristic defines a first tint level or color classification of the first displaying means and the second tint characteristic defines a second tint level or color classification of the second displaying means, the first tint level being different than the second tint level.

Example 28 includes the head-wearable apparatus of any one of examples 21-27, wherein the first tint characteristic includes at least one of a grey lens, a yellow lens, a brown lens or a polarized lens, and the second tint characteristic includes another one of the at least grey lens, the yellow lens, the brown lens or the polarized lens.

Example 29 may be a non-transitory computer readable medium including comprising instructions that, when executed, cause at least one processor to at least: read a first code of a first lens when the first lens is carried by a frame of a head-wearable apparatus; identify a first optical characteristic of the first lens based on the first code; adjust a setting of an image generator based on the first optical characteristic; and project an image on to the first lens using the adjusted setting.

Example 30 includes the non-transitory computer readable medium of example 29, wherein the first optical characteristic is a first tint characteristic.

Example 31 includes the non-transitory computer readable medium of any one of examples 29-30, wherein the instructions are further to cause the at least one processor to adjust a brightness of the image generator.

Example 32 includes the non-transitory computer readable medium of any one of examples 29-31, wherein the instructions are further to cause the at least one processor to detect if no lens is carried by the frame of the head-wearable apparatus.

Example 33 includes the non-transitory computer readable medium of any one of examples 29-32, wherein the instructions are further to cause the at least one processor to not project the image when no lens is carried by the frame.

Example 34 may be a method of controlling an image generator of a head-wearable device including reading, by executing an instruction via a processor, a first code of a first lens when the first lens is carried by a frame of the head-wearable apparatus; identifying, by executing an instruction via the processor, a first optical characteristic of the first lens based on the first code; adjusting, by executing an instruction via the processor, a setting based on the first optical characteristic; and projecting an image on the first lens using the adjusted setting.

Example 35 includes the method of example 34, wherein the first optical characteristic is a first tint characteristic of the first lens.

Example 36 includes the method of any one of examples 34-35, further including adjusting a brightness of the image generator.

Example 37 includes the method of any one of examples 34-36, further including detecting if no lens is carried by the frame of the head-wearable apparatus.

Example 38 includes the method of any one of examples 34-37, further including not projecting the image when no lens is carried by the frame.

Example 39 includes the method of any one of examples 34-38, further including: removing the first lens from the frame; attaching a second lens to the frame; reading, by executing an instruction via a processor, a second code of the second lens when the second lens is carried by the frame of the head-wearable apparatus; identifying, by executing an instruction via the processor, a second optical characteristic of the second lens based on the second code; adjusting, by executing an instruction via the processor, a setting based on the second optical characteristic; and projecting an image on the second lens using the adjusted setting.

Example 40 includes the method of any one of examples 34-39, wherein the first optical characteristic of the first lens includes a first tint characteristic and the second optical characteristic includes a second tint characteristic different than the first tint characteristic.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. Glasses comprising:
   a frame;
   an image generator coupled to the frame;
   a first lens removably carriable by the frame, the first lens having a first identifier to provide a first code representative of a first optical characteristic of the first lens, the first identifier including at least one notch that defines a first pattern representative of the first optical characteristic of the first lens, the image generator to project an image toward the first lens when the first lens is carried by the frame; and
   a reader to read the first code when the first lens is carried by the frame, the reader including at least one proximity sensor, each proximity sensor to project light towards the first identifier and sense reflected light to detect a depth of a respective notch.

2. The glasses of claim 1, further including a processor to identify the first optical characteristic based on the first code, and wherein the processor is to adjust a first parameter of the image generator to a first setting in response to identifying the first optical characteristic based on the first code.

3. The glasses of claim 2, further including a second lens removably carriable by the frame, the second lens being interchangeable with the first lens, the second lens having a second identifier to provide a second code representative of a second optical characteristic of the second lens, the second identifier including at least one other notch that defines a second pattern representative of the second optical characteristic of the second lens, the image generator to project the image toward the second lens when the second lens is carried by the frame, the reader to read the second code when the second lens is carried by the frame by each proximity sensor of the reader projecting light towards the second identifier and sensing reflected light to detect a depth of a respective notch.

4. The glasses of claim 3, wherein the first optical characteristic is a first tint characteristic and the second optical characteristic is a second tint characteristic different from the first tint characteristic.

5. The glasses of claim 3, wherein the processor is to identify the second optical characteristic based on the second code, and to adjust the first parameter to a second setting different from the first setting in response to identifying the second optical characteristic based on the second code.

6. The glasses of claim 3, further including a power manager, the power manager to remove power to the image generator when the reader does not read either the first code or the second code.

7. A method of controlling an image generator of a head-wearable apparatus, the method comprising:
   reading, by a reader in response to executing an instruction via a processor, a first code of a first lens when the first lens is carried by a frame of the head-wearable apparatus, wherein reading the first code by the reader includes projecting light by at least one proximity sensor of the reader towards a first identifier of the first lens, the first identifier including at least one notch that defines a first pattern representative of the first code, and sensing reflected light to detect a depth of a respective notch;
   identifying, by executing an instruction via the processor, a first optical characteristic of the first lens based on the first code;
   adjusting, by executing an instruction via the processor, a setting based on the first optical characteristic; and
   projecting an image on the first lens using the adjusted setting.

8. The method of claim 7, further including adjusting a brightness of the image generator.

9. The method of claim 7, further including detecting if no lens is carried by the frame of the head-wearable apparatus, and further including not projecting the image when no lens is carried by the frame.

10. The method of claim 7, further including:
    removing the first lens from the frame;
    attaching a second lens to the frame;
    reading, by the reader in response to executing an instruction via a processor, a second code of the second lens when the second lens is carried by the frame of the head-wearable apparatus, wherein reading the second code by the reader includes projecting light by the at least one proximity sensor of the reader towards a second identifier of the second lens, the second identifier including at least one notch that defines a second pattern representative of the second code, and sensing reflected light to detect a depth of a respective notch;

identifying, by executing an instruction via the processor, a second optical characteristic of the second lens based on the second code;

adjusting, by executing an instruction via the processor, a setting based on the second optical characteristic; and projecting an image on the second lens using the adjusted setting.

11. The method of claim 10, wherein the first optical characteristic of the first lens includes a first tint characteristic and the second optical characteristic includes a second tint characteristic different from the first tint characteristic.

12. Glasses comprising: a frame;
an image generator coupled to the frame;
a first lens carried by the frame, the first lens including an identifier that comprises a reflective surface and is located on a perimeter of the first lens, the image generator to project an image toward the first lens;
an optical detector to detect the reflective surface of the first lens;
a power manager, the power manager to remove power to the image generator when the optical detector does not detect the reflective surface of the first lens, the power manager to provide power to the image generator when the optical detector does detect the reflective surface of the first lens.

* * * * *